United States Patent
Chen et al.

(10) Patent No.: US 10,618,920 B2
(45) Date of Patent: Apr. 14, 2020

(54) FUNCTIONALIZED PARTICLES HAVING MODIFIED PHASES

(71) Applicant: AGILENT TECHNOLOGIES, INC., Santa Clara, CA (US)

(72) Inventors: Wu Chen, Newark, DE (US); Yingyu Li, Newark, DE (US); Ta-Chen Wei, Newark, DE (US); Xiaoli Wang, West Chester, PA (US)

(73) Assignee: AGILENT TECHNOLOGIES, INC., Santa Clara, CA (US)

( * ) Notice: Subject to any disclaimer, the term of this patent is extended or adjusted under 35 U.S.C. 154(b) by 309 days.

(21) Appl. No.: 15/173,382

(22) Filed: Jun. 3, 2016

(65) Prior Publication Data
US 2017/0349612 A1    Dec. 7, 2017

(51) Int. Cl.
| B01J 20/283 | (2006.01) |
| C07F 7/18 | (2006.01) |
| C07F 7/08 | (2006.01) |
| B01D 15/32 | (2006.01) |
| B01J 20/22 | (2006.01) |
| B01J 20/28 | (2006.01) |
| C01B 33/12 | (2006.01) |

(52) U.S. Cl.
CPC .......... *C07F 7/1804* (2013.01); *B01D 15/325* (2013.01); *B01J 20/22* (2013.01); *B01J 20/283* (2013.01); *B01J 20/28016* (2013.01); *C01B 33/12* (2013.01); *C07F 7/0838* (2013.01); *C07F 7/0876* (2013.01); *C07F 7/1892* (2013.01)

(58) Field of Classification Search
CPC .... C07F 7/1836; C07F 7/0849; C07F 7/0836; C07F 7/1804; C01B 33/12; B01D 15/325; B01J 20/283; B01J 20/22; C07D 213/24
See application file for complete search history.

(56) References Cited

U.S. PATENT DOCUMENTS

| 4,383,047 | A | 5/1983 | Stevens et al. |
| 4,519,905 | A | 5/1985 | Stevens et al. |
| 5,374,755 | A | 12/1994 | Neue et al. |
| 5,645,883 | A | 7/1997 | Russell et al. |
| 6,645,378 | B1 | 11/2003 | Lui et al. |
| 7,074,491 | B2 | 7/2006 | Lui et al. |
| 7,166,226 | B2 | 1/2007 | Woodruff et al. |
| 7,202,159 | B2 * | 4/2007 | Ganapathiraman .... B82Y 10/00 257/E21.26 |
| 7,238,426 | B2 * | 7/2007 | Jiang .................... B01D 15/305 427/221 |
| 7,402,243 | B2 | 7/2008 | Liu et al. |
| 7,468,130 | B2 | 12/2008 | Liu et al. |
| 7,557,232 | B2 | 7/2009 | Liu et al. |
| 8,137,590 | B2 | 3/2012 | Briehn et al. |
| 8,182,679 | B2 | 5/2012 | Liu et al. |
| 8,277,883 | B2 | 10/2012 | Chen et al. |
| 8,357,628 | B2 | 1/2013 | Wei et al. |
| 8,658,277 | B2 * | 2/2014 | Wyndham .......... B01J 20/28095 428/314.2 |
| 9,034,447 | B2 | 5/2015 | Pohl et al. |
| 9,138,721 | B2 | 9/2015 | Liang et al. |
| 9,144,756 | B2 | 9/2015 | Liu et al. |
| 9,145,481 | B2 * | 9/2015 | Wyndham .......... B01J 20/28095 |
| 9,314,712 | B2 | 4/2016 | Liu et al. |
| 2003/0196958 | A1 | 10/2003 | Liu et al. |
| 2006/0070937 | A1 | 4/2006 | Rustamov et al. |
| 2007/0059211 | A1 * | 3/2007 | Edmiston ............... G01N 21/05 422/82.11 |
| 2009/0311533 | A1 | 12/2009 | Chen et al. |
| 2010/0035039 | A1 * | 2/2010 | Jing ......................... C08J 7/04 428/304.4 |
| 2010/0300971 | A1 | 12/2010 | Jiang et al. |
| 2010/0320373 | A1 | 12/2010 | Appelblad |
| 2012/0273404 | A1 | 11/2012 | Wyndham et al. |
| 2013/0029843 | A1 | 1/2013 | Edmiston et al. |
| 2014/0069870 | A1 | 3/2014 | Pohl |
| 2014/0260563 | A1 | 9/2014 | Liu et al. |
| 2014/0273264 | A1 | 9/2014 | Liu et al. |

(Continued)

FOREIGN PATENT DOCUMENTS

| JP | 11216722 | * | 8/1999 |
| JP | 2015098098 | * | 5/2015 |

(Continued)

OTHER PUBLICATIONS

Capacci-Daniel, Crystal Growth & Design, vol. 10(2), 952-962, 2010. (Year: 2010).*
Persson, CA149:524162, abstract only of J Separation Science, 31(9), 1504-1510, 2008. (Year: 2008).*
Ji, Analyst, vol. 139, 5594-5599, 2014. (Year: 2014).*
Plumere, Electrochimica Acta, Vol. 53, 1244-1251, 2007. (Year: 2007).*
Ahmed, Advanced Materials/Adv. Mater., vol. 24(45), 6042-6048, 2012. (Year: 2012).*

(Continued)

*Primary Examiner* — D Margaret M Seaman

(57) ABSTRACT

Modified silica particles are provided. Aspects of the particles include an outer layer that is composed of organically-modified silica comprising a siloxane-linked hydrophilic group, such as a charged functional group or a polar neutral functional group. The modified silica particles can form the basis of a variety of chromatography support materials. Also provided are methods of preparing the subject particles. Aspects of the methods include contacting silica particles with water, an ionic fluoride and an organosilane reagent comprising a hydrophilic moiety to produce modified silica particles wherein the hydrophilic moiety of the organosilane reagent is incorporated into an outer layer of the silica particles. Chromatography supports and kits including the subject particles and methods of using the same are also provided.

20 Claims, 8 Drawing Sheets

(56) References Cited

U.S. PATENT DOCUMENTS

2016/0122368 A1 5/2016 Liu et al.
2018/0154332 A1* 6/2018 Brousmiche ........... B01D 15/32

FOREIGN PATENT DOCUMENTS

WO WO2007070001 6/2007
WO 2011012019 A1 2/2011

OTHER PUBLICATIONS

Kohler, J Chromatography, Vol. 385, 125-150, 1987. (Year: 1987).*
Han, J Mater Chem, 8(6), 1459-1463, 1998. (Year: 1998).*
Fuji, Langmuir, vol. 15, 4584-4589, 1999. (Year: 1999).*
Zhuravlev, Colloids and Surfaces A: Physicochemical and Engineering Aspects, vol. 173, 1-38, 2000. (Year: 2000).*
Substance Record for SID 30714627, PubChem, Dec. 4, 2007.
Bui, et al., Tris(hydroxymethyl)aminomethane-functionahzed silica particles and their application for hydrophilic interaction chromatography, Journal of Separation Science, vol. 33, 2010, 2965-2976.
WIPO, et al., International Search Report and Written Opinion dated Nov. 8, 2017, Application No. PCT/US2017/035065, 12 pages.
Communication pursuant to Rule 164(1) EPC dated Jan. 7, 2020, Application No. 17807352.4, 11 pages.

* cited by examiner

FUNCTIONALIZED PARTICLES HAVING MODIFIED PHASES

INTRODUCTION

The C18 and C8 stationary phases are widely used reversed phases for HPLC column chromatography. The hydrophobicity interaction with the stationary phase is the main mechanism for retention of analytes. In general, these C18 and C8 phases can separate the mixtures of neutral, polar, acidic and basic compounds. For highly polar species, a mobile phase including a high percentage of water, for example, greater than 95% water, can be used to effectively retain and separate one or more of the species. Such conditions routinely cause conventional C8 and C18 stationary phases to demonstrate diminished retention properties over time, or to suddenly lose retention properties when the flow of the carrier phase is temporarily stopped. This loss in retention properties is commonly due to the phenomenon of hydrophobic phase collapse. Phase collapse can occur when the carbon chains of a stationary phase, such as C8 or C18 chains, gradually cluster together when a carrier mobile phase including a high percentage of water is passed through the stationary phase. Phase collapse significantly decreases the interaction between the stationary phase and the mobile phase. The mobile phases containing a high water percentage can also be expelled from pores in the stationary phase, due to repulsion between the polar carrier phase and the hydrophobic stationary phase surface. The expulsion from pores can be accelerated when pressure in a chromatography column drops, e.g., when the system pump, that supplies a flow of the mobile phase to the column, is stopped.

Polar enhanced stationary phases, such as hydrophilic C18 phases and polar-embedded alkyl phases, have been employed to inhibit phase collapse. Both hydrophilic C18 and polar-embedded phases allow the surface to be wetted with water and fosters greater interaction between the mobile phase and the stationary phase. They also provide different analyte selectivity from conventional C8 and C18 stationary phases. Hydrophilic C18 phases can have less dense C18 bonding and are either not end-capped or are end-capped with polar functional groups such as alcohols and ethers, to increase the polarity of the surface. Polar-embedded alkyl phases contain a polar functional group, such as an amide, ether, or carbamate in the alkyl group of the stationary phase attached to the particle surface. The embedded polar group increases the interaction of carrier phase and the stationary phase via hydrogen-bonding, thereby resulting in a layer of water on the substrate surface. Polar-embedded phases can have excellent peak shapes for highly polar and basic compounds. Both hydrophilic C18 and polar-embedded stationary phases focus on the development of the stationary phase rather than silica treatment before phase bonding.

SUMMARY

Modified silica particles are provided. Aspects of the particles include an outer layer that is composed of organically-modified silica comprising a siloxane-linked hydrophilic group, such as a charged functional group or a polar neutral functional group. The modified silica particles can form the basis of a variety of chromatography support materials. Also provided are methods of preparing the subject particles. Aspects of the methods include contacting silica particles with water, an ionic fluoride and an organosilane reagent including a hydrophilic moiety to produce modified silica particles wherein the hydrophilic moiety of the organosilane reagent is incorporated into an outer layer of the silica particles. Chromatography supports and kits including the subject particles and methods of using the same are also provided.

BRIEF DESCRIPTION OF THE FIGURES

The skilled artisan will understand that the drawings, described below, are for illustration purposes only. The drawings are not intended to limit the scope of the present teachings in any way.

DEFINITIONS

Figure 1:
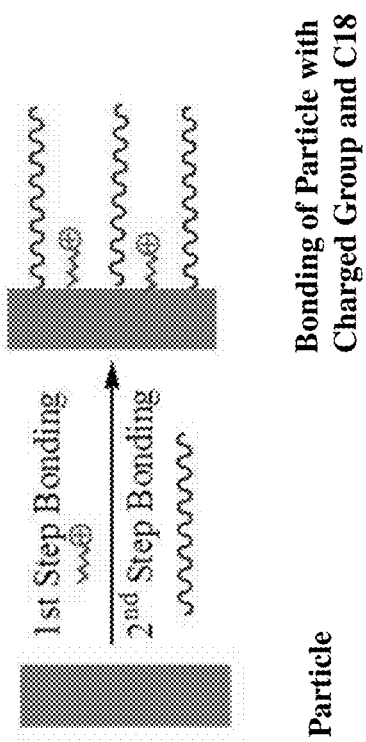
FIG. 1 shows a schematic scheme for preparation of a surface modified particle including a C18 phase where modification occurs via surface derivatization of a formed particle. Modified particles prepared by the method depicted in FIG. 1 is disclosed in US 2012/0273404 and are distinguished from the subject particles where organosilane groups are incorporated into the outer layer of the particle during formation, as depicted in FIG. 2.
Figure 2:
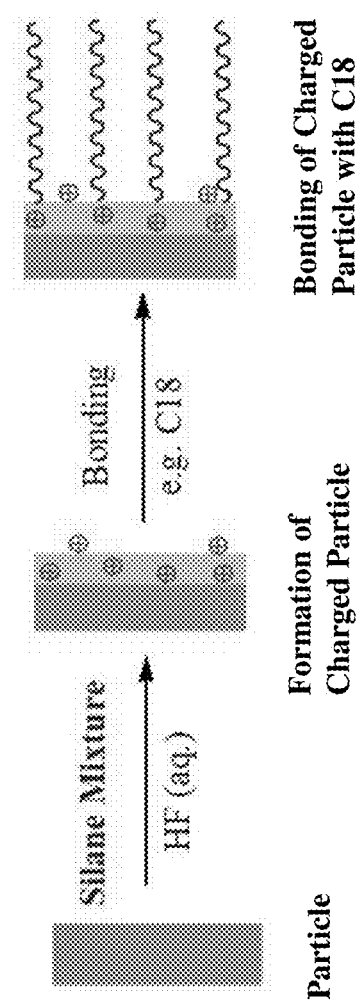
FIG. 2 illustrates a schematic scheme of preparation of an exemplary particle of the present disclosure including an outer layer organically modified with siloxane-linked positively charged groups. A first step includes formation of a charged particle incorporating siloxane-linked positively charged groups. In the second step depicted the surface of the particles are bonded with the C18 groups of a stationary phase.

Before describing exemplary embodiments in greater detail, the following definitions are set forth to illustrate and define the meaning and scope of the terms used in the description.

Following long-standing patent law convention, the terms "a", "an", and "the" refer to "one or more" when used in this application, including the claims. Thus, for example, reference to "a cell" includes a plurality of such cells, and so forth.

As used herein, the term "about," when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

As used herein, ranges can be expressed as from "about" one particular value, and/or to "about" another particular value. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

Unless defined otherwise, all technical and scientific terms used herein have the same meaning as commonly understood by one of ordinary skill in the art to which this invention belongs. Singleton, et al., DICTIONARY OF MICROBIOLOGY AND MOLECULAR BIOLOGY, 2D ED., John Wiley and Sons, New York (1994), and Hale & Markham, THE HARPER COLLINS DICTIONARY OF BIOLOGY, Harper Perennial, N.Y. (1991) provide one of skill with the general meaning of many of the terms used herein. Still, certain terms are defined below for the sake of clarity and ease of reference.

The methods described herein include multiple steps. Each step can be performed after a predetermined amount of time has elapsed between steps, as desired. As such, the time between performing each step can be 1 second or more, 10 seconds or more, 30 seconds or more, 60 seconds or more, 5 minutes or more, 10 minutes or more, 60 minutes or more and including 5 hours or more. In certain embodiments, each subsequent step is performed immediately after completion of the previous step. In other embodiments, a step can be performed after an incubation or waiting time after completion of the previous step, e.g., a few minutes to an overnight waiting time.

Numeric ranges are inclusive of the numbers defining the range.

The term "separating", as used herein, refers to physical separation of two elements (e.g., by size or affinity, etc.) as well as degradation of one element, leaving the other intact.

The terms "derivatized" and "modified" refers to chemical modification of molecules. The skilled artisan would readily recognize the variety of ways molecules can be modified, such as oxidations, reductions, electrophilic/nucleophilic substitutions, alkylations, ester/amide formations and the like. For example, particles of the present disclosure can be chemically modified by silation.

The term "sample" as used herein relates to a material or mixture of materials, in some cases, in fluid, e.g., aqueous, form, containing one or more components of interest. Samples may be derived from a variety of sources such as from food stuffs, environmental materials, a biological sample or solid, such as tissue or fluid isolated from an individual, including but not limited to, for example, plasma, serum, spinal fluid, semen, lymph fluid, the external sections of the skin, respiratory, intestinal, and genitourinary tracts, tears, saliva, milk, blood cells, tumors, organs, and also samples of in vitro cell culture constituents (including but not limited to conditioned medium resulting from the growth of cells in cell culture medium, putatively virally infected cells, recombinant cells, and cell components).

Components in a sample are termed "analytes" herein. In many embodiments, the sample is a complex sample containing at least about $10^2$, $5 \times 10^2$, $10^3$, $5 \times 10^3$, $10^4$, $5 \times 10^4$, $10^5$, $5 \times 10^5$, $10^6$, $5 \times 10^6$, $10^7$, $5 \times 10^7$, $10^8$, $10^9$, $10^{10}$, $10^{11}$, $10^{12}$ or more species of analyte.

The term "analyte" are used herein interchangeably and refer to a known or unknown component of a sample. In some cases, analytes are biopolymers, i.e., an oligomer or polymer such as an oligonucleotide, a peptide, a polypeptide, an antibody, or the like. In some cases, an "analyte" is referenced as a moiety in a mobile phase (typically fluid), to be separated by chromatography using the subject particles.

The terms "polypeptide" and "protein", used interchangeably herein, refer to a polymeric form of amino acids of any length, which can include coded and non-coded amino acids, chemically or biochemically modified or derivatized amino acids, and polypeptides having modified peptide backbones.

In general, polypeptides may be of any length, e.g., greater than 2 amino acids, greater than 4 amino acids, greater than about 10 amino acids, greater than about 20 amino acids, greater than about 50 amino acids, greater than about 100 amino acids, greater than about 300 amino acids, usually up to about 500 or 1000 or more amino acids.

"Peptides" are generally greater than 2 amino acids, greater than 4 amino acids, greater than about 10 amino acids, greater than about 20 amino acids, usually up to about 50 amino acids. In some embodiments, peptides are between 5 and 30 amino acids in length.

By "agitation," is meant sufficient movement of the solution containing the particles so that the particles do not agglomerate. Agitation can be done by stirring, sparging, ultrasonicating, shaking and the like. Stirring the mixture is preferred.

As used herein, the term "bonding", "bonded", "bonds" when used in context of the subject particles refers to the attachment of chemical moieties to the surface of previously prepared or formed silica particles to produce a chromatography stationary phase (e.g., a C8 or C18 reverse phase). During the process of bonding, the surface of the particles can be derivatized (e.g., via reaction of surface silanol groups) with an organosilane reagent (e.g., a C8 or C18 reagent), however the underlying siloxane structure of the silica particles themselves is not itself modified. In some cases, a particle that has been bonded with a stationary phase can be referred to a surface modified particle.

As used herein, the expression "support material" or "chromatographic material" means granules or particles capable of forming a packed bed or column having 1) sorptively active surfaces or 2) surfaces capable of being coated with a sorptively active substance to form sorptively active surfaces.

The term "porous", unless specifically stated to the contrary, is intended to refer to any type or degree of porosity, including superficial porosity, and varying sizes and extents of micropores, mesopores, and/or macropores.

A residue of a chemical species, as used in the specification and concluding claims, refers to the moiety that is the resulting product of the chemical species in a particular reaction scheme or subsequent formulation or chemical product, regardless of whether the moiety is actually obtained from the chemical species. Thus, an ethylene glycol residue in a polyester refers to one or more —OCH$_2$CH$_2$O— repeat units in the polyester, regardless of whether ethylene glycol is used to prepare the polyester. Similarly, a sebacic acid residue in a polyester refers to one or more —CO(CH$_2$)$_8$CO— moieties in the polyester, regardless of whether the residue is obtained by reacting sebacic acid or an ester thereof to obtain the polyester.

As used herein the term "PEG" refers to a polyethylene glycol or a modified polyethylene glycol. Modified polyethylene glycol polymers include a methoxypolyethylene glycol, and polymers that are unsubstituted or substituted at one end with an alkyl, a substituted alkyl or a functional group (e.g., as described herein). Any convenient linking groups may be utilized at the terminal of a PEG to connect the group to a moiety of interest.

As used herein, the term "substituted" is contemplated to include all permissible substituents of organic compounds. In a broad aspect, the permissible substituents include acyclic and cyclic, branched and unbranched, carbocyclic and heterocyclic, and aromatic and nonaromatic substituents of organic compounds. Illustrative substituents include, for example, those described below. The permissible substituents can be one or more and the same or different for appropriate organic compounds. For purposes of this disclosure, the heteroatoms, such as nitrogen, can have hydrogen substituents and/or any permissible substituents of organic compounds described herein which satisfy the valencies of the heteroatoms. This disclosure is not intended to be limited in any manner by the permissible substituents of organic compounds. Also, the terms "substitution" or "substituted with" include the implicit proviso that such substitution is in accordance with permitted valence of the substituted atom and the substituent, and that the substitution results in a stable compound, e.g., a compound that does not spontaneously undergo transformation such as by rearrangement, cyclization, elimination, etc.

The term "alkyl" as used herein is a branched or unbranched saturated hydrocarbon group of 1 to 24 carbon atoms, such as methyl, ethyl, n-propyl, isopropyl, n-butyl, isobutyl, t-butyl, pentyl, hexyl, heptyl, octyl, nonyl, decyl, dodecyl, tetradecyl, hexadecyl, eicosyl, tetracosyl, and the like. The alkyl group can also be substituted or unsubstituted. The alkyl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxamate, hydroxy, ketone, nitro, silyl, sulfo-oxo, sulfonyl, sulfone, sulfoxide, or thiol, as described below.

The term "substituted alkyl" refers to an alkyl group as defined herein wherein one or more carbon atoms in the alkyl chain have been optionally replaced with a heteroatom such as O—, N—, S—, —S(O)$_n$— (where n is 0 to 2), —NR— (where R is hydrogen or alkyl) and having from 1 to 5 substituents selected from the group consisting of alkoxy, substituted alkoxy, cycloalkyl, substituted cycloalkyl, cycloalkenyl, substituted cycloalkenyl, acyl, acylamino, acyloxy, amino, aminoacyl, aminoacyloxy, oxyaminoacyl, azido, cyano, halogen, hydroxyl, oxo, thioketo, carboxyl, carboxylalkyl, thioaryloxy, thioheteroaryloxy, thioheterocyclooxy, thiol, thioalkoxy, substituted thioalkoxy, aryl, aryloxy, heteroaryl, heteroaryloxy, heterocyclyl, heterocyclooxy, hydroxyamino, alkoxyamino, nitro, —SO-alkyl, —SO-aryl, —SO-heteroaryl, —SO$_2$-alkyl, —SO$_2$-aryl, SO$_2$-heteroaryl, and —NR$^a$R$^b$, wherein R' and R" may be the same or different and are chosen from hydrogen, optionally substituted alkyl, cycloalkyl, alkenyl, cycloalkenyl, alkynyl, aryl, heteroaryl and heterocyclic.

Substituted alkyl groups are also specifically referred to herein by identifying the specific substituent(s) on the alkyl group. For example, the term "halogenated alkyl" specifically refers to an alkyl group that is substituted with one or more halide, e.g., fluorine, chlorine, bromine, or iodine. The term "alkylalcohol" specifically refers to an alkyl group that is substituted with one or more hydroxyl groups, as described below. The term "alkylthiol" specifically refers to an alkyl group that is substituted with one or more thiol groups, as described below. The term "alkylalkoxy" specifically refers to an alkyl group that is substituted with one or more alkoxy groups, as described below. The term "alkylamino" specifically refers to an alkyl group that is substituted with one or more amino groups, as described below, and the like.

"Alkylene" refers to divalent aliphatic hydrocarbyl groups preferably having from 1 to 6 and more preferably 1 to 3 carbon atoms that are either straight-chained or branched, and which are optionally interrupted with one or more groups selected from —O—, —NR$^{10}$—, —NR$^{10}$C (O)—, —C(O)NR$^{10}$— and the like. This term includes, by way of example, methylene (—CH$_2$—), ethylene (—CH$_2$CH$_2$—), n-propylene (—CH$_2$CH$_2$CH$_2$—), iso-propylene (—CH$_2$CH(CH$_3$)—), (—C(CH$_3$)$_2$CH$_2$CH$_2$—), (—C (CH$_3$)$_2$CH$_2$C(O)—), (—C(CH$_3$)$_2$CH$_2$C(O)NH—), (—CH (CH$_3$)CH$_2$—), and the like.

"Substituted alkylene" refers to an alkylene group having from 1 to 3 hydrogens replaced with substituents as described for carbons in the definition of "substituted" below.

The term "alkane" refers to alkyl group and alkylene group, as defined herein.

The term "alkylaminoalkyl", "alkylaminoalkenyl" and "alkylaminoalkynyl" refers to the groups R'NHR"— where R' is alkyl group as defined herein and R" is alkylene, alkenylene or alkynylene group as defined herein.

The term "alkaryl" or "aralkyl" refers to the groups -alkylene-aryl and -substituted alkylene-aryl where alkylene, substituted alkylene and aryl are defined herein.

"Alkoxy" refers to the group —O-alkyl, wherein alkyl is as defined herein. Alkoxy includes, by way of example, methoxy, ethoxy, n-propoxy, isopropoxy, n-butoxy, t-butoxy, sec-butoxy, n-pentoxy, and the like. The term "alkoxy" also refers to the groups alkenyl-O—, cycloalkyl-O—, cycloalkenyl-O—, and alkynyl-O—, where alkenyl, cycloalkyl, cycloalkenyl, and alkynyl are as defined herein.

The term "substituted alkoxy" refers to the groups substituted alkyl-O—, substituted alkenyl-O—, substituted cycloalkyl-O—, substituted cycloalkenyl-O—, and substituted alkynyl-O— where substituted alkyl, substituted alkenyl, substituted cycloalkyl, substituted cycloalkenyl and substituted alkynyl are as defined herein.

The term "alkoxyamino" refers to the group —NH-alkoxy, wherein alkoxy is defined herein.

The term "haloalkoxy" refers to the groups alkyl-O— wherein one or more hydrogen atoms on the alkyl group have been substituted with a halo group and include, by way of examples, groups such as trifluoromethoxy, and the like.

The term "haloalkyl" refers to a substituted alkyl group as described above, wherein one or more hydrogen atoms on the alkyl group have been substituted with a halo group. Examples of such groups include, without limitation, fluoroalkyl groups, such as trifluoromethyl, difluoromethyl, trifluoroethyl and the like.

The term "alkylalkoxy" refers to the groups -alkylene-O-alkyl, alkylene-O-substituted alkyl, substituted alkylene-O-alkyl, and substituted alkylene-O-substituted alkyl wherein alkyl, substituted alkyl, alkylene and substituted alkylene are as defined herein.

The term "alkylthioalkoxy" refers to the group -alkylene-S-alkyl, alkylene-S-substituted alkyl, substituted alkylene-S-alkyl and substituted alkylene-S-substituted alkyl wherein alkyl, substituted alkyl, alkylene and substituted alkylene are as defined herein.

"Alkenyl" refers to straight chain or branched hydrocarbyl groups having from 2 to 6 carbon atoms and preferably 2 to 4 carbon atoms and having at least 1 and preferably from 1 to 2 sites of double bond unsaturation. This term includes, by way of example, bi-vinyl, allyl, and but-3-en-1-yl. Included within this term are the cis and trans isomers or mixtures of these isomers.

The term "substituted alkenyl" refers to an alkenyl group as defined herein having from 1 to 5 substituents, or from 1 to 3 substituents, selected from alkoxy, substituted alkoxy, cycloalkyl, substituted cycloalkyl, cycloalkenyl, substituted cycloalkenyl, acyl, acylamino, acyloxy, amino, substituted amino, aminoacyl, aminoacyloxy, oxyaminoacyl, azido, cyano, halogen, hydroxyl, oxo, thioketo, carboxyl, carboxylalkyl, thioaryloxy, thioheteroaryloxy, thioheterocyclooxy, thiol, thioalkoxy, substituted thioalkoxy, aryl, aryloxy, heteroaryl, heteroaryloxy, heterocyclyl, heterocyclooxy, hydroxyamino, alkoxyamino, nitro, —SO-alkyl, —SO-substituted alkyl, —SO-aryl, —SO-heteroaryl, —SO$_2$-alkyl, —SO$_2$-substituted alkyl, —SO$_2$-aryl and —SO$_2$— heteroaryl.

"Alkynyl" refers to straight or branched monovalent hydrocarbyl groups having from 2 to 6 carbon atoms and preferably 2 to 3 carbon atoms and having at least 1 and preferably from 1 to 2 sites of triple bond unsaturation. Examples of such alkynyl groups include acetylenyl (—C≡CH), and propargyl (—CH$_2$C≡CH).

The term "substituted alkynyl" refers to an alkynyl group as defined herein having from 1 to 5 substituents, or from 1 to 3 substituents, selected from alkoxy, substituted alkoxy, cycloalkyl, substituted cycloalkyl, cycloalkenyl, substituted cycloalkenyl, acyl, acylamino, acyloxy, amino, substituted amino, aminoacyl, aminoacyloxy, oxyaminoacyl, azido, cyano, halogen, hydroxyl, oxo, thioketo, carboxyl, carboxylalkyl, thioaryloxy, thioheteroaryloxy, thioheterocyclooxy, thiol, thioalkoxy, substituted thioalkoxy, aryl, aryloxy, heteroaryl, heteroaryloxy, heterocyclyl, heterocyclooxy, hydroxyamino, alkoxyamino, nitro, —SO-alkyl, —SO-substituted alkyl, —SO-aryl, —SO-heteroaryl, —SO$_2$-alkyl, —SO$_2$-substituted alkyl, —SO$_2$-aryl, and —SO$_2$— heteroaryl.

"Alkynyloxy" refers to the group —O-alkynyl, wherein alkynyl is as defined herein. Alkynyloxy includes, by way of example, ethynyloxy, propynyloxy, and the like.

"Acyl" refers to the groups H—C(O)—, alkyl-C(O)—, substituted alkyl-C(O)—, alkenyl-C(O)—, substituted alkenyl-C(O)—, alkynyl-C(O)—, substituted alkynyl-C(O)—, cycloalkyl-C(O)—, substituted cycloalkyl-C(O)—, cycloalkenyl-C(O)—, substituted cycloalkenyl-C(O)—, aryl-C(O)—, substituted aryl-C(O)—, heteroaryl-C(O)—, substituted heteroaryl-C(O)—, heterocyclyl-C(O)—, and substituted heterocyclyl-C(O)—, wherein alkyl, substituted alkyl, alkenyl, substituted alkenyl, alkynyl, substituted alkynyl, cycloalkyl, substituted cycloalkyl, cycloalkenyl, substituted cycloalkenyl, aryl, substituted aryl, heteroaryl, substituted heteroaryl, heterocyclic, and substituted heterocyclic are as defined herein. For example, acyl includes the "acetyl" group CH$_3$C(O)—

"Acylamino" refers to the groups —NR$^{20}$C(O)alkyl, —NR$^{20}$C(O) substituted alkyl, NR$^{20}$C(O)cycloalkyl, —NR$^{20}$C(O) substituted cycloalkyl, —NR$^{20}$C(O)cycloalkenyl, —NR$^{20}$C(O) substituted cycloalkenyl, —NR$^{20}$C(O) alkenyl, —NR$^{20}$C(O) substituted alkenyl, —NR$^{20}$C(O) alkynyl, —NR$^{20}$C(O) substituted alkynyl, —NR$^{20}$C(O)aryl, —NR$^{20}$C(O) substituted aryl, —NR$^{20}$C(O)heteroaryl, —NR$^{20}$C(O) substituted heteroaryl, —NR$^{20}$C(O)heterocyclic, and —NR$^{20}$C(O) substituted heterocyclic, wherein R$^{20}$ is hydrogen or alkyl and wherein alkyl, substituted alkyl, alkenyl, substituted alkenyl, alkynyl, substituted alkynyl, cycloalkyl, substituted cycloalkyl, cycloalkenyl, substituted cycloalkenyl, aryl, substituted aryl, heteroaryl, substituted heteroaryl, heterocyclic, and substituted heterocyclic are as defined herein.

"Aminocarbonyl" or the term "aminoacyl" refers to the group —C(O)NR$^{21}$R$^{22}$, wherein R$^{21}$ and R$^{22}$ independently are selected from the group consisting of hydrogen, alkyl, substituted alkyl, alkenyl, substituted alkenyl, alkynyl, substituted alkynyl, aryl, substituted aryl, cycloalkyl, substituted cycloalkyl, cycloalkenyl, substituted cycloalkenyl, heteroaryl, substituted heteroaryl, heterocyclic, and substituted heterocyclic and where R$^{21}$ and R$^{22}$ are optionally joined together with the nitrogen bound thereto to form a heterocyclic or substituted heterocyclic group, and wherein alkyl, substituted alkyl, alkenyl, substituted alkenyl, alkynyl, substituted alkynyl, cycloalkyl, substituted cycloalkyl, cycloalkenyl, substituted cycloalkenyl, aryl, substituted aryl, heteroaryl, substituted heteroaryl, heterocyclic, and substituted heterocyclic are as defined herein.

"Aminocarbonylamino" refers to the group —NR$^{21}$C(O)NR$^{22}$R$^{23}$ where R$^{21}$, R$^{22}$, and R$^{23}$ are independently selected from hydrogen, alkyl, aryl or cycloalkyl, or where two R groups are joined to form a heterocyclyl group.

The term "alkoxycarbonylamino" refers to the group —NRC(O)OR where each R is independently hydrogen, alkyl, substituted alkyl, aryl, heteroaryl, or heterocyclyl wherein alkyl, substituted alkyl, aryl, heteroaryl, and heterocyclyl are as defined herein.

The term "acyloxy" refers to the groups alkyl-C(O)O—, substituted alkyl-C(O)O—, cycloalkyl-C(O)O—, substituted cycloalkyl-C(O)O—, aryl-C(O)O—, heteroaryl-C(O)O—, and heterocyclyl-C(O)O— wherein alkyl, substituted alkyl, cycloalkyl, substituted cycloalkyl, aryl, heteroaryl, and heterocyclyl are as defined herein.

"Aminosulfonyl" refers to the group —SO$_2$NR$^{21}$R$^{22}$, wherein R$^{21}$ and R$^{22}$ independently are selected from the group consisting of hydrogen, alkyl, substituted alkyl, alkenyl, substituted alkenyl, alkynyl, substituted alkynyl, aryl, substituted aryl, cycloalkyl, substituted cycloalkyl, cycloalkenyl, substituted cycloalkenyl, heteroaryl, substituted heteroaryl, heterocyclic, substituted heterocyclic and where R$^{21}$ and R$^{22}$ are optionally joined together with the nitrogen bound thereto to form a heterocyclic or substituted heterocyclic group and alkyl, substituted alkyl, alkenyl, substituted alkenyl, alkynyl, substituted alkynyl, cycloalkyl, substituted cycloalkyl, cycloalkenyl, substituted cycloalkenyl, aryl, substituted aryl, heteroaryl, substituted heteroaryl, heterocyclic and substituted heterocyclic are as defined herein.

"Sulfonylamino" refers to the group —NR$^{21}$SO$_2$R$^{22}$, wherein R$^{21}$ and R$^{22}$ independently are selected from the group consisting of hydrogen, alkyl, substituted alkyl, alkenyl, substituted alkenyl, alkynyl, substituted alkynyl, aryl, substituted aryl, cycloalkyl, substituted cycloalkyl, cycloalkenyl, substituted cycloalkenyl, heteroaryl, substituted heteroaryl, heterocyclic, and substituted heterocyclic and where R$^{21}$ and R$^{22}$ are optionally joined together with the atoms bound thereto to form a heterocyclic or substituted heterocyclic group, and wherein alkyl, substituted alkyl, alkenyl, substituted alkenyl, alkynyl, substituted alkynyl, cycloalkyl, substituted cycloalkyl, cycloalkenyl, substituted cycloalkenyl, aryl, substituted aryl, heteroaryl, substituted heteroaryl, heterocyclic, and substituted heterocyclic are as defined herein.

"Aryl" or "Ar" refers to a monovalent aromatic carbocyclic group of from 6 to 18 carbon atoms having a single ring (such as is present in a phenyl group) or a ring system having multiple condensed rings (examples of such aromatic ring systems include naphthyl, anthryl and indanyl) which condensed rings may or may not be aromatic, provided that the point of attachment is through an atom of an aromatic ring. This term includes, by way of example, phenyl and naphthyl. Unless otherwise constrained by the definition for the aryl substituent, such aryl groups can optionally be substituted with from 1 to 5 substituents, or from 1 to 3 substituents, selected from acyloxy, hydroxy, thiol, acyl, alkyl, alkoxy, alkenyl, alkynyl, cycloalkyl, cycloalkenyl, substituted alkyl, substituted alkoxy, substituted alkenyl, substituted alkynyl, substituted cycloalkyl, substituted cycloalkenyl, amino, substituted amino, aminoacyl, acylamino, alkaryl, aryl, aryloxy, azido, carboxyl, carboxylalkyl, cyano, halogen, nitro, heteroaryl, heteroaryloxy, heterocyclyl, heterocyclooxy, aminoacyloxy, oxyacylamino, thioalkoxy, substituted thioalkoxy, thioaryloxy, thioheteroaryloxy, —SO-alkyl, —SO-substituted alkyl, —SO-aryl, —SO-heteroaryl, —SO$_2$-alkyl, —SO$_2$-substituted alkyl, —SO$_2$-aryl, —SO$_2$-heteroaryl and trihalomethyl.

"Aryloxy" refers to the group —O-aryl, wherein aryl is as defined herein, including, by way of example, phenoxy, naphthoxy, and the like, including optionally substituted aryl groups as also defined herein.

"Amino" refers to the group —NH$_2$.

The term "substituted amino" refers to the group —NRR where each R is independently selected from the group consisting of hydrogen, alkyl, substituted alkyl, cycloalkyl, substituted cycloalkyl, alkenyl, substituted alkenyl, cycloalkenyl, substituted cycloalkenyl, alkynyl, substituted alkynyl, aryl, heteroaryl, and heterocyclyl provided that at least one R is not hydrogen.

The term "azido" refers to the group —N$_3$.

"Carboxyl," "carboxy" or "carboxylate" refers to —CO$_2$H or salts thereof.

"Carboxyl ester" or "carboxy ester" or the terms "carboxyalkyl" or "carboxylalkyl" refers to the groups —C(O)O-alkyl, —C(O)O-substituted alkyl, —C(O)O-alkenyl, —C(O)O-substituted alkenyl, —C(O)O-alkynyl, —C(O)O-substituted alkynyl, —C(O)O-aryl, —C(O)O-substituted aryl, —C(O)O-cycloalkyl, —C(O)O-substituted cycloalkyl, —C(O)O-cycloalkenyl, —C(O)O-substituted cycloalkenyl, —C(O)O-heteroaryl, —C(O)O-substituted heteroaryl, —C(O)O-heterocyclic, and —C(O)O-substituted heterocyclic, wherein alkyl, substituted alkyl, alkenyl, substituted alkenyl, alkynyl, substituted alkynyl, cycloalkyl, substituted cycloalkyl, cycloalkenyl, substituted cycloalkenyl, aryl, substituted aryl, heteroaryl, substituted heteroaryl, heterocyclic, and substituted heterocyclic are as defined herein.

"(Carboxyl ester)oxy" or "carbonate" refers to the groups —O—C(O)O— alkyl, —O—C(O)O-substituted alkyl, —O—C(O)O-alkenyl, —O—C(O)O-substituted alkenyl, —O—C(O)O-alkynyl, —O—C(O)O-substituted alkynyl, —O—C(O)O-aryl, —O—C(O)O-substituted aryl, —O—C(O)O-cycloalkyl, —O—C(O)O-substituted cycloalkyl, —O—C(O)O-cycloalkenyl, —O—C(O)O-substituted cycloalkenyl, —O—C(O)O-heteroaryl, —O—C(O)O-substituted heteroaryl, —O—C(O)O-heterocyclic, and —O—C(O)O-substituted heterocyclic, wherein alkyl, substituted alkyl, alkenyl, substituted alkenyl, alkynyl, substituted alkynyl, cycloalkyl, substituted cycloalkyl, cycloalkenyl, substituted cycloalkenyl, aryl, substituted aryl, heteroaryl, substituted heteroaryl, heterocyclic, and substituted heterocyclic are as defined herein.

"Cyano" or "nitrile" refers to the group —CN.

"Cycloalkyl" refers to cyclic alkyl groups of from 3 to 10 carbon atoms having single or multiple cyclic rings including fused, bridged, and spiro ring systems. Examples of suitable cycloalkyl groups include, for instance, adamantyl, cyclopropyl, cyclobutyl, cyclopentyl, cyclooctyl and the like. Such cycloalkyl groups include, by way of example, single ring structures such as cyclopropyl, cyclobutyl, cyclopentyl, cyclooctyl, and the like, or multiple ring structures such as adamantanyl, and the like.

The term "substituted cycloalkyl" refers to cycloalkyl groups having from 1 to 5 substituents, or from 1 to 3 substituents, selected from alkyl, substituted alkyl, alkoxy, substituted alkoxy, cycloalkyl, substituted cycloalkyl, cycloalkenyl, substituted cycloalkenyl, acyl, acylamino, acyloxy, amino, substituted amino, aminoacyl, aminoacyloxy, oxyaminoacyl, azido, cyano, halogen, hydroxyl, oxo, thioketo, carboxyl, carboxylalkyl, thioaryloxy, thioheteroaryloxy, thioheterocyclooxy, thiol, thioalkoxy, substituted thioalkoxy, aryl, aryloxy, heteroaryl, heteroaryloxy, heterocyclyl, heterocyclooxy, hydroxyamino, alkoxyamino, nitro, —SO-alkyl, —SO-substituted alkyl, —SO-aryl, —SO-heteroaryl, —SO$_2$-alkyl, —SO$_2$-substituted alkyl, —SO$_2$-aryl and —SO$_2$-heteroaryl.

"Cycloalkenyl" refers to non-aromatic cyclic alkyl groups of from 3 to 10 carbon atoms having single or multiple rings and having at least one double bond and preferably from 1 to 2 double bonds.

The term "substituted cycloalkenyl" refers to cycloalkenyl groups having from 1 to 5 substituents, or from 1 to 3 substituents, selected from alkoxy, substituted alkoxy, cycloalkyl, substituted cycloalkyl, cycloalkenyl, substituted cycloalkenyl, acyl, acylamino, acyloxy, amino, substituted amino, aminoacyl, aminoacyloxy, oxyaminoacyl, azido, cyano, halogen, hydroxyl, keto, thioketo, carboxyl, carboxylalkyl, thioaryloxy, thioheteroaryloxy, thioheterocyclooxy, thiol, thioalkoxy, substituted thioalkoxy, aryl, aryloxy, heteroaryl, heteroaryloxy, heterocyclyl, heterocyclooxy, hydroxyamino, alkoxyamino, nitro, —SO-alkyl, —SO-substituted alkyl, —SO-aryl, —SO-heteroaryl, —SO$_2$— alkyl, —SO$_2$-substituted alkyl, —SO$_2$-aryl and —SO$_2$-heteroaryl.

"Cycloalkynyl" refers to non-aromatic cycloalkyl groups of from 5 to 10 carbon atoms having single or multiple rings and having at least one triple bond.

"Cycloalkoxy" refers to —O-cycloalkyl.

"Cycloalkenyloxy" refers to —O-cycloalkenyl.

"Halo" or "halogen" refers to fluoro, chloro, bromo, and iodo.

"Hydroxy" or "hydroxyl" refers to the group —OH.

"Heteroaryl" refers to an aromatic group of from 1 to 15 carbon atoms, such as from 1 to 10 carbon atoms and 1 to 10 heteroatoms selected from the group consisting of oxygen, nitrogen, and sulfur within the ring. Such heteroaryl groups can have a single ring (such as, pyridinyl, imidazolyl or furyl) or multiple condensed rings in a ring system (for example as in groups such as, indolizinyl, quinolinyl, benzofuran, benzimidazolyl or benzothienyl), wherein at least one ring within the ring system is aromatic and at least one ring within the ring system is aromatic, provided that the point of attachment is through an atom of an aromatic ring. In certain embodiments, the nitrogen and/or sulfur ring atom(s) of the heteroaryl group are optionally oxidized to provide for the N-oxide (N→O), sulfinyl, or sulfonyl moieties. This term includes, by way of example, pyridinyl, pyrrolyl, indolyl, thiophenyl, and furanyl. Unless otherwise constrained by the definition for the heteroaryl substituent, such heteroaryl groups can be optionally substituted with 1 to 5 substituents, or from 1 to 3 substituents, selected from acyloxy, hydroxy, thiol, acyl, alkyl, alkoxy, alkenyl, alkynyl, cycloalkyl, cycloalkenyl, substituted alkyl, substituted alkoxy, substituted alkenyl, substituted alkynyl, substituted cycloalkyl, substituted cycloalkenyl, amino, substituted amino, aminoacyl, acylamino, alkaryl, aryl, aryloxy, azido, carboxyl, carboxylalkyl, cyano, halogen, nitro, heteroaryl, heteroaryloxy, heterocyclyl, heterocyclooxy, aminoacyloxy, oxyacylamino, thioalkoxy, substituted thioalkoxy, thioaryloxy, thioheteroaryloxy, —SO-alkyl, —SO-substituted alkyl, —SO-aryl, —SO-heteroaryl, —SO$_2$-alkyl, —SO$_2$-substituted alkyl, —SO$_2$-aryl and —SO$_2$-heteroaryl, and trihalomethyl.

The term "heteroaralkyl" refers to the groups -alkylene-heteroaryl where alkylene and heteroaryl are defined herein. This term includes, by way of example, pyridylmethyl, pyridylethyl, indolylmethyl, and the like.

"Heteroaryloxy" refers to —O-heteroaryl.

"Heterocycle," "heterocyclic," "heterocycloalkyl," and "heterocyclyl" refer to a saturated or unsaturated group having a single ring or multiple condensed rings, including fused bridged and spiro ring systems, and having from 3 to 20 ring atoms, including 1 to 10 hetero atoms. These ring atoms are selected from the group consisting of nitrogen, sulfur, or oxygen, wherein, in fused ring systems, one or more of the rings can be cycloalkyl, aryl, or heteroaryl, provided that the point of attachment is through the non-aromatic ring. In certain embodiments, the nitrogen and/or sulfur atom(s) of the heterocyclic group are optionally oxidized to provide for the N-oxide, —S(O)—, or —SO$_2$- moieties.

Examples of heterocycles and heteroaryls include, but are not limited to, azetidine, pyrrole, imidazole, pyrazole, pyridine, pyrazine, pyrimidine, pyridazine, indolizine, isoindole, indole, dihydroindole, indazole, purine, quinolizine, isoquinoline, quinoline, phthalazine, naphthylpyridine, quinoxaline, quinazoline, cinnoline, pteridine, carbazole, carboline, phenanthridine, acridine, phenanthroline, isothiazole, phenazine, isoxazole, phenoxazine, phenothiazine, imidazolidine, imidazoline, piperidine, piperazine, indoline, phthalimide, 1,2,3,4-tetrahydroisoquinoline, 4,5,6,7-tetrahydrobenzo[b]thiophene, thiazole, thiazolidine, thiophene, benzo[b]thiophene, morpholinyl, thiomorpholinyl (also referred to as thiamorpholinyl), 1,1-dioxothiomorpholinyl, piperidinyl, pyrrolidine, tetrahydrofuranyl, and the like.

Unless otherwise constrained by the definition for the heterocyclic substituent, such heterocyclic groups can be optionally substituted with 1 to 5, or from 1 to 3 substituents, selected from alkoxy, substituted alkoxy, cycloalkyl, substituted cycloalkyl, cycloalkenyl, substituted cycloalkenyl, acyl, acylamino, acyloxy, amino, substituted amino, aminoacyl, aminoacyloxy, oxyaminoacyl, azido, cyano, halogen, hydroxyl, oxo, thioketo, carboxyl, carboxylalkyl, thioaryloxy, thioheteroaryloxy, thioheterocyclooxy, thiol, thioalkoxy, substituted thioalkoxy, aryl, aryloxy, heteroaryl, heteroaryloxy, heterocyclyl, heterocyclooxy, hydroxyamino, alkoxyamino, nitro, —SO-alkyl, —SO— substituted alkyl, —SO-aryl, —SO-heteroaryl, —SO$_2$-alkyl, —SO$_2$-substituted alkyl, —SO$_2$-aryl, —SO$_2$-heteroaryl, and fused heterocycle.

"Heterocyclyloxy" refers to the group —O-heterocyclyl.

The term "heterocyclylthio" refers to the group heterocyclic-S—.

The term "heterocyclene" refers to the diradical group formed from a heterocycle, as defined herein.

The term "hydroxyamino" refers to the group —NHOH.

"Nitro" refers to the group —NO$_2$.

"Oxo" refers to the atom (═O).

The term "silyl" as used herein is represented by the formula —SiAA$^1$A$^2$, where A, A$^1$, and A$^2$ can be, independently, hydrogen, alkyl, halogenated alkyl, alkoxy, alkenyl, alkynyl, aryl, heteroaryl, cycloalkyl, cycloalkenyl, heterocycloalkyl, or heterocycloalkenyl group described above.

"Sulfonyl" refers to the group SO$_2$-alkyl, SO$_2$-substituted alkyl, SO$_2$-alkenyl, SO$_2$-substituted alkenyl, SO$_2$-cycloalkyl, SO$_2$-substituted cycloalkyl, SO$_2$-cycloalkenyl, SO$_2$-substituted cylcoalkenyl, SO$_2$-aryl, SO$_2$-substituted aryl, SO$_2$-heteroaryl, SO$_2$-substituted heteroaryl, SO$_2$-heterocyclic, and SO$_2$-substituted heterocyclic, wherein alkyl, substituted alkyl, alkenyl, substituted alkenyl, alkynyl, substituted alkynyl, cycloalkyl, substituted cycloalkyl, cycloalkenyl, substituted cycloalkenyl, aryl, substituted aryl, heteroaryl, substituted heteroaryl, heterocyclic, and substituted heterocyclic are as defined herein. Sulfonyl includes, by way of example, methyl-$SO_2$—, phenyl-$SO_2$—, and 4-methylphenyl-$SO_2$—.

"Sulfonyloxy" refers to the group —$OSO_2$-alkyl, $OSO_2$-substituted alkyl, $OSO_2$-alkenyl, $OSO_2$-substituted alkenyl, $OSO_2$-cycloalkyl, $OSO_2$-substituted cycloalkyl, $OSO_2$-cycloalkenyl, $OSO_2$-substituted cylcoalkenyl, $OSO_2$-aryl, $OSO_2$-substituted aryl, $OSO_2$-heteroaryl, $OSO_2$-substituted heteroaryl, $OSO_2$-heterocyclic, and $OSO_2$ substituted heterocyclic, wherein alkyl, substituted alkyl, alkenyl, substituted alkenyl, alkynyl, substituted alkynyl, cycloalkyl, substituted cycloalkyl, cycloalkenyl, substituted cycloalkenyl, aryl, substituted aryl, heteroaryl, substituted heteroaryl, heterocyclic, and substituted heterocyclic are as defined herein.

The term "aminocarbonyloxy" refers to the group —OC (O)NRR where each R is independently hydrogen, alkyl, substituted alkyl, aryl, heteroaryl, or heterocyclic wherein alkyl, substituted alkyl, aryl, heteroaryl and heterocyclic are as defined herein.

"Thiol" refers to the group —SH.

"Thioxo" or the term "thioketo" refers to the atom (=S).

"Alkylthio" or the term "thioalkoxy" refers to the group —S-alkyl, wherein alkyl is as defined herein. In certain embodiments, sulfur may be oxidized to —S(O)—. The sulfoxide may exist as one or more stereoisomers.

The term "substituted thioalkoxy" refers to the group —S-substituted alkyl.

The term "thioaryloxy" refers to the group aryl-S— wherein the aryl group is as defined herein including optionally substituted aryl groups also defined herein.

The term "thioheteroaryloxy" refers to the group heteroaryl-S— wherein the heteroaryl group is as defined herein including optionally substituted aryl groups as also defined herein.

The term "thioheterocyclooxy" refers to the group heterocyclyl-S— wherein the heterocyclyl group is as defined herein including optionally substituted heterocyclyl groups as also defined herein.

In addition to the disclosure herein, the term "substituted," when used to modify a specified group or radical, can also mean that one or more hydrogen atoms of the specified group or radical are each, independently of one another, replaced with the same or different substituent groups as defined below.

In addition to the groups disclosed with respect to the individual terms herein, substituent groups for substituting for one or more hydrogens (any two hydrogens on a single carbon can be replaced with =O, =$NR^{70}$, =N—$OR^{70}$, =$N_2$ or =S) on saturated carbon atoms in the specified group or radical are, unless otherwise specified, —$R^{60}$, halo, =O, —$OR^{70}$, —$SR^{70}$, —$NR^{80}R^{80}$, trihalomethyl, —CN, —OCN, —SCN, —NO, —$NO_2$, =$N_2$, —$N_3$, —$SO_2R^{70}$, —$SO_2^-$ $M^+$, —$SO_3R^{70}$, —$OSO_2R^{70}$, —$OSO_3^-M^+$, —$OSO_2OR^{70}$, —$P(O)(O^-)_2(M^+)_2$, —$P(O)(OR^{70})O^-M^+$, —$P(O)(OR^{70})_2$, —$C(O)R^{70}$, —$C(S)R^{70}$, —$C(NR^{70})R^{70}$, —$C(O)O^-M^+$, —$C(O)OR^{70}$, —$C(S)OR^{70}$, —$C(O)NR^{80}R^{80}$, —$C(NR^{70})NR^{80}R^{80}$, —$OC(O)R^{70}$, —$OC(S)R^{70}$, —$OC(O)O^-M^+$, —$OC(O)OR^{70}$, —$OC(S)OR^{70}$, —$NR^{70}C(O)R^{70}$, —$NR^{70}C(S)R^{70}$, —$NR^{70}CO_2^-M^+$, —$NR^{70}CO_2R^{70}$, —$NR^{70}C(S)OR^{70}$, —$NR^{70}C(O)NR^{80}R^{80}$, —$NR^{70}C(NR^{70})R^{70}$ and —$NR^{70}C(NR^{70})NR^{80}R^{80}$, where $R^{60}$ is selected from the group consisting of optionally substituted alkyl, cycloalkyl, heteroalkyl, heterocycloalkylalkyl, cycloalkylalkyl, aryl, arylalkyl, heteroaryl and heteroarylalkyl, each $R^{70}$ is independently hydrogen or $R^{60}$; each $R^{80}$ is independently $R^{70}$ or alternatively, two $R^{80}$'s, taken together with the nitrogen atom to which they are bonded, form a 5-, 6- or 7-membered heterocycloalkyl which may optionally include from 1 to 4 of the same or different additional heteroatoms selected from the group consisting of O, N and S, of which N may have —H or $C_1$-$C_3$ alkyl substitution; and each $M^+$ is a counter ion with a net single positive charge. Each $M^+$ may independently be, for example, an alkali ion, such as $K^+$, $Na^+$, $Li^+$; an ammonium ion, such as $^+N(R^{60})_4$; or an alkaline earth ion, such as $[Ca^{2+}]_{0.5}$, $[Mg^{2+}]_{0.5}$, or $[Ba^{2+}]_{0.5}$ ("subscript 0.5 means that one of the counter ions for such divalent alkali earth ions can be an ionized form of a compound of the invention and the other a typical counter ion such as chloride, or two ionized compounds disclosed herein can serve as counter ions for such divalent alkali earth ions, or a doubly ionized compound of the invention can serve as the counter ion for such divalent alkali earth ions). As specific examples, —$NR^{80}R^{80}$ is meant to include —$NH_2$, —NH-alkyl, N-pyrrolidinyl, N-piperazinyl, 4N-methyl-piperazin-1-yl and N-morpholinyl.

In addition to the disclosure herein, substituent groups for hydrogens on unsaturated carbon atoms in "substituted" alkene, alkyne, aryl and heteroaryl groups are, unless otherwise specified, —$R^{60}$, halo, —$O^-M^+$, —$OR^{70}$, —$SR^{70}$, —$S^-M^+$, —$NR^{80}R^{80}$, trihalomethyl, —$CF_3$, —CN, —OCN, —SCN, —NO, —$NO_2$, —$N_3$, —$SO_2R^{70}$, —$SO_3^-$ $M^+$, —$SO_3R^{70}$, —$OSO_2R^{70}$, —$OSO_3^-M^+$, —$OSO_3R^{70}$, —$PO_3^{-2}(M^+)_2$, —$P(O)(OR^{70})O^-M^+$, —$P(O)(OR^{70})_2$, —$C(O)R^{70}$, —$C(S)R^{70}$, —$C(NR^{70})R^{70}$, —$CO_2^-M^+$, —$CO_2R^{70}$, —$C(S)OR^{70}$, —$C(O)NR^{80}R^{80}$, —$C(NR^{70})NR^{80}R^{80}$, —$OC(O)R^{70}$, —$OC(S)R^{70}$, —$OCO_2^-M^+$, —$OCO_2R^{70}$, —$OC(S)OR^{70}$, —$NR^{70}C(O)R^{70}$, —$NR^{70}C(S)R^{70}$, —$NR^{70}CO_2^-M^+$, —$NR^{70}CO_2R^{70}$, —$NR^{70}C(S)OR^{70}$, —$NR^{70}C(O)NR^{80}R^{80}$, —$NR^{70}C(NR^{70})R^{70}$ and —$NR^{70}C(NR^{70})NR^{80}R^{80}$, where $R^{60}$, $R^{70}$, $R^{80}$ and $M^+$ are as previously defined, provided that in case of substituted alkene or alkyne, the substituents are not —$O^-$ $M^+$, —$OR^{70}$, —$SR^{70}$, or —$S^-M^+$.

In addition to the groups disclosed with respect to the individual terms herein, substituent groups for hydrogens on nitrogen atoms in "substituted" heteroalkyl and cycloheteroalkyl groups are, unless otherwise specified, —$R^{60}$, —$O^-M^+$, —$OR^{70}$, —$SR^{70}$, —$S^-M^+$, —$NR^{80}R^{80}$, trihalomethyl, —$CF_3$, —CN, —NO, —$NO_2$, —$S(O)_2R^{70}$, —$S(O)_2O^-M^+$, —$S(O)_2OR^{70}$, —$OS(O)_2R^{70}$, —$OS(O)_2O^-M^+$, —$OS(O)_2OR^{70}$, —$P(O)(O^-)_2(M^+)_2$, —$P(O)(OR^{70})O^-M^+$, —$P(O)(OR^{70})(OR^{70})$, —$C(O)R^{70}$, —$C(S)R^{70}$, —$C(NR^{70})R^{70}$, —$C(O)OR^{70}$, —$C(S)OR^{70}$, —$C(O)NR^{80}R^{80}$, —$C(NR^{70})NR^{80}R^{80}$, —$OC(O)R^{70}$, —$OC(S)R^{70}$, —$OC(O)OR^{70}$, —$OC(S)OR^{70}$, —$NR^{70}C(O)R^{70}$, —$NR^{70}C(S)R^{70}$, —$NR^{70}C(O)OR^{70}$, —$NR^{70}C(S)OR^{70}$, —$NR^{70}C(O)NR^{80}R^{80}$, —$NR^{70}C(NR^{70})R^{70}$ and —$NR^{70}C(NR^{70})NR^{80}R^{80}$, where $R^{60}$, $R^{70}$, $R^{80}$ and $M^+$ are as previously defined.

In addition to the disclosure herein, in a certain embodiment, a group that is substituted has 1, 2, 3, or 4 substituents, 1, 2, or 3 substituents, 1 or 2 substituents, or 1 substituent.

It is understood that in all substituted groups defined above, polymers arrived at by defining substituents with further substituents to themselves (e.g., substituted aryl having a substituted aryl group as a substituent which is itself substituted with a substituted aryl group, which is further substituted by a substituted aryl group, etc.) are not intended for inclusion herein. In such cases, the maximum number of such substitutions is three. For example, serial substitutions of substituted aryl groups specifically contemplated herein are limited to substituted aryl-(substituted aryl)-substituted aryl.

Unless indicated otherwise, the nomenclature of substituents that are not explicitly defined herein are arrived at by naming the terminal portion of the functionality followed by the adjacent functionality toward the point of attachment. For example, the substituent "arylalkyloxycarbonyl" refers to the group (aryl)-(alkyl)-O—C(O)—.

As to any of the groups disclosed herein which contain one or more substituents, it is understood, of course, that such groups do not contain any substitution or substitution patterns which are sterically impractical and/or synthetically non-feasible. In addition, the subject compounds include all stereochemical isomers arising from the substitution of these compounds.

The term "pharmaceutically acceptable salt" means a salt which is acceptable for administration to a patient, such as a mammal (salts with counterions having acceptable mammalian safety for a given dosage regime). Such salts can be derived from pharmaceutically acceptable inorganic or organic bases and from pharmaceutically acceptable inorganic or organic acids. "Pharmaceutically acceptable salt" refers to pharmaceutically acceptable salts of a compound, which salts are derived from a variety of organic and inorganic counter ions well known in the art and include, by way of example only, sodium, potassium, calcium, magnesium, ammonium, tetraalkylammonium, and the like; and when the molecule contains a basic functionality, salts of organic or inorganic acids, such as hydrochloride, hydrobromide, formate, tartrate, besylate, mesylate, acetate, maleate, oxalate, and the like.

The term "salt thereof" means a compound formed when a proton of an acid is replaced by a cation, such as a metal cation or an organic cation and the like. Where applicable, the salt is a pharmaceutically acceptable salt, although this is not required for salts of intermediate compounds that are not intended for administration to a patient. By way of example, salts of the present compounds include those wherein the compound is protonated by an inorganic or organic acid to form a cation, with the conjugate base of the inorganic or organic acid as the anionic component of the salt.

"Solvate" refers to a complex formed by combination of solvent molecules with molecules or ions of the solute. The solvent can be an organic compound, an inorganic compound, or a mixture of both. Some examples of solvents include, but are not limited to, methanol, N,N-dimethylformamide, tetrahydrofuran, dimethylsulfoxide, and water. When the solvent is water, the solvate formed is a hydrate.

"Stereoisomer" and "stereoisomers" refer to compounds that have same atomic connectivity but different atomic arrangement in space. Stereoisomers include cis-trans isomers, E and Z isomers, enantiomers, and diastereomers.

"Tautomer" refers to alternate forms of a molecule that differ only in electronic bonding of atoms and/or in the position of a proton, such as enol-keto and imine-enamine tautomers, or the tautomeric forms of heteroaryl groups containing a —N=C(H)—NH— ring atom arrangement, such as pyrazoles, imidazoles, benzimidazoles, triazoles, and tetrazoles. A person of ordinary skill in the art would recognize that other tautomeric ring atom arrangements are possible.

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific embodiment or combination of embodiments of the methods of the invention.

It is understood that the compositions disclosed herein have certain functions. Disclosed herein are certain structural requirements for performing the disclosed functions and it is understood that there are a variety of structures that can perform the same function that are related to the disclosed structures, and that these structures will typically achieve the same result.

Unless stated to the contrary, a formula with chemical bonds shown only as solid lines and not as wedges or dashed lines contemplates each possible isomer, e.g., each enantiomer and diastereomer, and a mixture of isomers, such as a racemic or scalemic mixture Other definitions of terms can appear throughout the specification.

DETAILED DESCRIPTION

Before the various embodiments are described, it is to be understood that the teachings of this disclosure are not limited to the particular embodiments described, and as such can, of course, vary. It is also to be understood that the terminology used herein is for the purpose of describing particular embodiments only, and is not intended to be limiting, since the scope of the present teachings will be limited only by the appended claims.

The section headings used herein are for organizational purposes only and are not to be construed as limiting the subject matter described in any way. While the present teachings are described in conjunction with various embodiments, it is not intended that the present teachings be limited to such embodiments. On the contrary, the present teachings encompass various alternatives, modifications, and equivalents, as will be appreciated by those of skill in the art.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present teachings, some exemplary methods and materials are now described.

The citation of any publication is for its disclosure prior to the filing date and should not be construed as an admission that the present claims are not entitled to antedate such publication by virtue of prior invention. Further, the dates of publication provided can be different from the actual publication dates which can be independently confirmed.

As will be apparent to those of skill in the art upon reading this disclosure, each of the individual embodiments described and illustrated herein has discrete components and features which can be readily separated from or combined with the features of any of the other several embodiments without departing from the scope or spirit of the present teachings. Any recited method can be carried out in the order of events recited or in any other order which is logically possible.

All patents and publications, including all sequences disclosed within such patents and publications, referred to herein are expressly incorporated by reference.

Organically Modified Particles

Aspects of the present disclosure include organically modified silica particles that are modified with an organosilane reagent or a mixture of organosilane reagents. The organosilane reagent can include a hydrophilic group. The present disclosure provides methods whereby the hydrophilic group of the organosilane reagent is incorporated into outer layers of particles during a rehydroxylation procedure (e.g., as described herein) to produce the subject modified silica particles. The particles can be organically modified not only via groups (e.g., silanol groups) at the particle surface but also via groups (e.g., silanol groups) that are below the particle surface and which are an integral part of an outer layer of the silica particles. As sued herein the term "layer" is used to refer to a part of the particle that is below the surface of the particle (e.g., not surface exposed or subsurface). A layer can be of any convenient depth and can be adjacent to and underlying the surface of the particle. In some cases, the particle has multiple sub-surface layers of modified silica material. In some instances, the outer layers of the particles are porous. In some instances, the outer layers of the particles are non-porous. In some cases, modification includes derivatization of silanol groups of the particles that are present in the starting material or that are generated in situ during the subject methods of preparation, e.g., during rehydroxylation of the silica particulate starting material. In certain instances, rehydroxylation includes cleavage of siloxane bonds in the underlying silica structure. As such, the modified silica particles can include an outer layer that is composed of organically-modified silica comprising a siloxane-linked hydrophilic group.

It is understood that the subject methods can also be applied to any convenient silica based planar surfaces to produce a modified silica substrate including a hydrophilic group in layers of the substrate, e.g., layers underlying the surface of the substrate. In some instances, any of the methods described herein can be applied to a planar silica substrate, such as a microarray or a slide surface. In certain instances, the planar substrate is a glass substrate.

As used herein, the term "siloxane-linked hydrophilic group" refers to a group that includes a siloxane linkage (e.g., linkage to a silica particle) and a hydrophilic group. "Siloxane linkage" refers to a —Si—O-Silica connection to a silica particle, e.g., a —Si(R)$_3$ group where each R is independently a —O—Si of a silica particle or an alkyl group and at least one R is —O-Silica. In some cases, the siloxane-linked hydrophilic group is monovalent because it includes one siloxane linkage (e.g., a single —Si(R)$_3$). In some cases, the siloxane-linked hydrophilic group is divalent because it includes two siloxane linkages (e.g., two distinct —Si(R)$_3$).

As used herein, the term "hydrophilic group" by itself refers to the residual monovalent or multivalent group that is connected to one or more siloxane linkage(s) and which includes a hydrophilic moiety and an optional linker. The hydrophilic moiety is a moiety that is well solvated in aqueous environments, e.g., under reverse phase (RP) chromatography conditions, and that imparts increased water solubility on the group to which it is attached or incorporated (e.g., the linker). In some cases, the hydrophilic moiety is referred to as a hydrophilic functional group. In some cases, the hydrophilic moiety is a heterocycle. In certain cases, the hydrophilic moiety is a heteroaryl. In some cases, the hydrophilic moiety is charged (e.g., ionic). In some cases, the hydrophilic moiety is polar and neutral (e.g., non-ionic). It is understood that certain functional groups may be present in either an ionic or a non-ionic form, dependent on the surrounding conditions, e.g., solvent, pH and the like, and that all such forms of the hydrophilic moieties described herein are meant to be included in the present disclosure. For example, the hydrophilic moiety can be a basic group which is neutral until protonated, e.g., under aqueous conditions of a suitable pH, or the hydrophilic moiety can be an acidic group which is neutral until deprotonated, e.g., under aqueous conditions of a suitable pH.

A hydrophilic moiety can increase the solubility of the group to which it is attached in a predominantly aqueous solution, as compared to a control group which lacks the hydrophilic moiety. A hydrophilic moiety is different from a hydrophobic moiety which is not well solvated in aqueous environments. In certain instances, a hydrophilic group includes at least one neutral polar functional group per 5 carbons, or at least one charged functional group per 7 carbons. In some instances, a hydrophilic group (e.g., the hydrophilic group in isolated form as a discrete molecule) has solubility in water of at least 1% by weight.

Hydrophilic groups and hydrophilic moieties of interest include, but are not limited to, Nitrogen-containing heterocycle, amide, carbamate, carboxylic acid carboxy ester, methyl ether, cyano, amine, sulfonamide, sulfonate, urea, thiourea, sulfonic acid, carboxylate, phosphonate, phosphate, sulfate, sulfinate, sulfonium, polyethylene glycols (PEG) and modified PEGs, hydroxyl, ammonium, guanidinium, pyridinium, polyamine and sulfonium, polyalcohols, straight chain or cyclic saccharides, primary, secondary, tertiary, or quaternary amines and polyamines, phosphonate groups, phosphinate groups, ascorbate groups, glycols, including, polyethers, —COOM', —SO$_3$M', —PO$_3$M', —NR$_3$+, Y', (CH$_2$CH$_2$O)$_p$R and mixtures thereof, where Y' can be any halogen, sulfate, sulfonate, or oxygen containing anion, p can be 1 to 500, each R can be independently H or an alkyl (such as methyl) and M' can be a cationic counterion or hydrogen, —(CH$_2$CH$_2$O)$_{yy}$CH$_2$CH$_2$XR$_{yy}$, —(CH$_2$CH$_2$O)$_{yy}$CH$_2$CH$_2$X—, —X(CH$_2$CH$_2$O)$_{yy}$CH$_2$CH$_2$—, glycol, and polyethylene glycol, wherein yy is selected from 1 to 1000, X is selected from O, S, and NR$^{ZZ}$, and R$^{ZZ}$ and R$^{YY}$ are independently selected from H and C1-3 alkyl. In some cases, a hydrophilic moiety is (CH$_2$)$_x$(OCH$_2$CH$_2$)$_y$OCH$_3$ where each x is independently an integer from 0-20, each y is independently an integer from 0 to 50.

Nitrogen-containing heterocycles of interest that find use as hydrophilic moieties include, but are not limited to, azetidine, pyrrole, imidazole, pyrazole, pyridine, pyrazine, pyrimidine, pyridazine, indolizine, isoindole, indole, dihydroindole, indazole, purine, quinolizine, isoquinoline, quinoline, and substituted versions thereof. In certain instances, the hydrophilic moiety is selected from 2-pyridyl, substituted 2-pyridyl, 3-pyridyl, substituted 3-pyridyl, 4-pyridyl and substituted 4-pyridyl.

As used herein, the term "linker" or "linkage" refers to a linking moiety that connects two groups (e.g., the hydrophilic moiety and the siloxane linkage(s)) and has a backbone of 100 atoms or less in length. A linker or linkage may be a covalent bond that connects two groups or a chain of between 1 and 100 atoms in length, such as 1 to 20 atoms in length, for example of 1, 2, 3, 4, 5, 6, 7, 8, 9, 10, 12, 14, 16, 18 or 20 atoms in length, where the linker may be linear, branched, cyclic or a single atom. The linker can be an alkyl linker. In certain cases, one, two, three, four or five or more carbon atoms of an alkyl linker backbone may be optionally substituted with a sulfur, nitrogen or oxygen heteroatom. The bonds between backbone atoms may be saturated or unsaturated, usually not more than one, two, or three unsaturated bonds will be present in a linker backbone. The linker may include one or more substituent groups, for example, a hydroxyl, an alkyl, a substituted alkyl, an aryl, a substituted aryl or an alkenyl group. A linker may include, without limitations, poly(ethylene glycol), ethers, thioethers, tertiary amines, alkyls, which may be straight or branched, e.g., methyl, ethyl, n-propyl, 1-methylethyl (iso-propyl), n-butyl, n-pentyl, 1,1-dimethylethyl (t-butyl), and the like. The linker backbone may include a cyclic group, for example, an aryl, a heterocycle or a cycloalkyl group, where 2 or more atoms, e.g., 2, 3 or 4 atoms, of the cyclic group are included in the backbone. A linker may be cleavable or non-cleavable.

The subject particles can include hybrid materials. One or more of the various regions of the subject particles can include hybrid material. By "hybrid" is meant that both an organic and an inorganic (e.g., inorganic oxide, such as silica) material are utilized together. The subject methods can be used to prepare modified silica particles that are organically modified hybrids. For example, hybrid silica refers to a material having the formula $SiO_2/(R^1_p R^2_q SiO_t)_n$ or $SiO_2/[R^3(R^1_r SiO_t)_m]_n$; wherein $R^1$ and $R^2$ are independently a substituted or unsubstituted $C_1$ to $C_{18}$ alkyl, alkenyl, alkynyl, or aryl group, wherein the substituents are selected from halogen, diol, amino-, alcohol, amide, cyano, ether, nitro, carbonyl, epoxide, sulfonyl, cation exchanger, anion exchanger, carbamate and urea, $R^3$ is a substituted or unsubstituted $C_1$ to $C_7$ alkylene, alkenylene, alkynylene, or arylene group moiety bridging two or more metal atoms, p and q are 0, 1, or 2, provided that p+q=1 or 2, and that when p+q=1, t=1.5, and when p+q=2, t=1; r is 0 or 1, provided that when r=0, t=1.5, and when r=1, t=1; m is an integer greater than or equal to 2; and n is a number from 0.01 to 100.

In some embodiments, the siloxane-linked hydrophilic group has one of the following formulae (Ib), (IIb) or (IIIb):

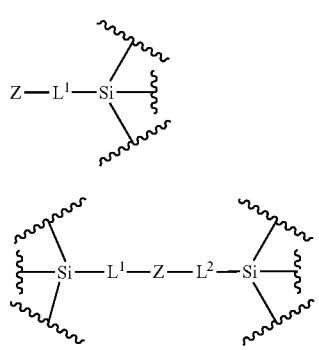

(Ib)

(IIb)

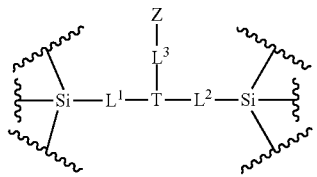

(IIIb)

wherein:
Z is a hydrophilic moiety (e.g., as described herein);
$L^1$, $L^2$ and $L^3$ are each independently a covalent bond or a linker; and
T is a branching atom or branching group.

In certain embodiments of formulae (Ib), (IIb) and (IIIb), the hydrophilic moiety Z is a nitrogen-containing heterocycle, amide, carbamate, carboxylic acid, carboxy ester, methyl ether, cyano, amine, ammonium, sulfonamide, sulfonate, urea, thiourea, hydroxyl, thiol, PEG, a zwitterionic group or a sulfonic acid. In some embodiments of formula (Ib), Z is selected from 2-pyridyl, 3-pyridyl, 4-pyridyl, —CONH$_2$, —OCONHMe, —NHCOOMe, NHCONH$_2$, —OMe, CN and SO$_3$H. In some embodiments of formula (IIb), Z is selected from —O— and —NR'—, wherein R' is H, an alkyl or a substituted alkyl. In some embodiments of formula (IIIb), Z is selected from 2-pyridyl, 3-pyridyl, 4-pyridyl, —CONH$_2$, —OCONHMe, —NHCOOMe, NHCONH$_2$, —OMe, CN and SO$_3$H. In some embodiments of formula (Ib), Z is a pyridyl or a substituted pyridyl. In some embodiments of formula (IIIb), Z is a pyridyl or a substituted pyridyl.

In some embodiments of formulae (Ib), (IIb) and (IIIb), $L^1$ and $L^2$ have a combined backbone length of 20 atoms or less, such as 10 or less, 9 or less, 8 or less, 7 or less, 6 or less, 5 or less, 4 or less, 3 or less, 2 or less, or 1. In some embodiments of formula (Ib), $L^1$ is a C1-C6 alkyl. In some embodiments of formula (IIb), $L^1$ and $L^2$ are each independently a C1-C6 alkyl. In certain instances, the combined length of $L^1$ and $L^2$ is 10 carbons or less, such as 8 carbons or less, 6 carbons or less, or 4 carbons or less. In some embodiments of formula (IIIb), $L^1$, $L^2$ and $L^3$ are each independently a covalent bond or a C1-C6 alkyl. In certain instances, the combined length of $L^1$ and $L^2$ is 10 carbons or less, such as 8 carbons or less, 6 carbons or less, or 4 carbons or less.

Any convenient branching atoms or groups can be utilized in formula (IIIb) to provide a connection to two siloxane linkages and a branched Z group. In some instances of formula (IIIb), T is selected from a trisubstituted nitrogen atom, a trisusbtituted carbon atom, a trisubstituted aryl or heteroaryl ring, a trisubstituted cycloalkyl or heterocycle ring. In certain cases, T is N. In certain cases, T is CH.

In some embodiments of formulae (Ib), the siloxane-linked hydrophilic group is described by one of the following structures:

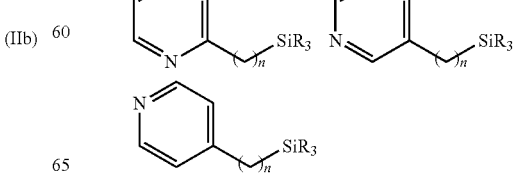

wherein each n is independently an integer from 1 to 18; and each R is independently an alkyl, a substituted alkyl or a siloxane linkage (e.g., —O-Silica connection to a silica particle), wherein at least one R is —O-Silica.

In some embodiments of formulae (Ib), the siloxane-linked hydrophilic group is described by one of the following structures:

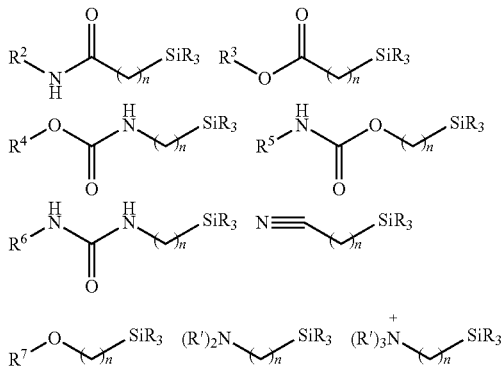

wherein each n is independently an integer from 1 to 18;

each R is independently an alkyl, a substituted alkyl or a siloxane linkage (e.g., —O-Silica connection to a silica particle), wherein at least one R is —O-Silica; and $R^2$-$R^7$ and R' are each independently H, an alkyl or a substituted alkyl.

In certain embodiments of formula (Ib), the linker $L^1$ includes an additional hydrophilic moiety (e.g., as described herein). In certain instances, $L^1$ has the formula -$L^4$-$Z^2$-$L^5$- where $Z^2$ is the additional hydrophilic moiety and $L^4$ and $L^5$ are linkers (e.g., non-polar, neutral linkers). In certain cases, $Z^2$ is an ammonium group, such as a dialkylammonium. In some embodiments of formulae (Ib), the siloxane-linked hydrophilic group has the formula (IVb):

HO$_3$S-$L^1$-SiR$_3$         (IVb)

where each R is independently an alkyl, a substituted alkyl or a siloxane linkage (e.g., —O-Silica connection to a silica particle), wherein at least one R is —O-Silica. In some embodiments of formulae (IVb), $L^1$ has the formula -$L^4$-$Z^2$-$L^5$- where $Z^2$ is the additional hydrophilic moiety (e.g., as described herein) and $L^4$ and $L^5$ are linkers (e.g., non-polar, neutral linkers). In certain cases of formula (IVb), $Z^2$ is an ammonium group, such as a dialkylammonium.

In some embodiments of formulae (IVb), the siloxane-linked hydrophilic group has the formula:

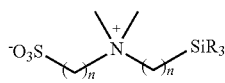

wherein each n is independently an integer from 1 to 18; and each R is independently an alkyl, a substituted alkyl or a siloxane linkage (e.g., —O-Silica connection to a silica particle), wherein at least one R is —O-Silica.

In some embodiments of formulae (IIb), the siloxane-linked hydrophilic group is described by one of the following structures:

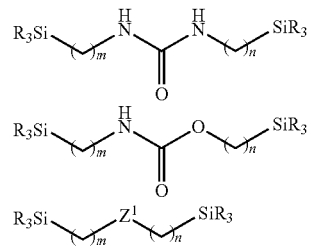

wherein:
n and m are independently an integer from 1 to 18;

each R is independently an alkyl, a substituted alkyl or a siloxane linkage (e.g., —O-Silica connection to a silica particle), wherein at least one R is —O-Silica; and $Z^1$ is selected from —O—, —NR'— and —N$^+$(R')$_2$—, wherein each R' is independently H, an alkyl or a substituted alkyl. In certain instances, each R is a siloxane linkage. In certain instances, $Z^1$ is —NR'— wherein each R' is independently H, an alkyl or a substituted alkyl. In certain instances, $Z^1$ is —N$^+$(R')$_2$—, wherein each R' is independently an alkyl or a substituted alkyl.

In some embodiments of formula (IIIb), the siloxane-linked hydrophilic group is described by one of the following structures:

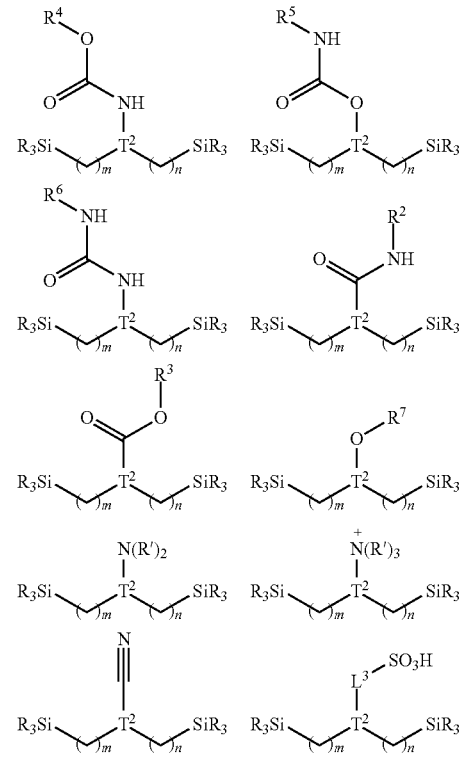

wherein:
n and m are independently an integer from 1 to 18;

each R is independently an alkyl, a substituted alkyl or a siloxane linkage (e.g., —O-Silica connection to a silica particle), wherein at least one R is —O-Silica;

$T^2$ is selected from a trisubstituted carbon or nitrogen atom; and $R^2$-$R^7$ and R' are each independently H, an alkyl or a substituted alkyl. In certain instances, $T^2$ is CH. In certain cases, $T^2$ is N. In certain cases, $T^2$ is $N^+R'$, wherein R' is an alkyl (e.g., methyl or ethyl). In certain instances, $R^2$ is H. In certain instances, $R^3$ is H. In certain instances, $R^4$ is H. In certain instances, $R^5$ is H. In certain instances, $R^6$ is H. In certain instances, $R^7$ is H. In certain instances, each R is H. In certain instances, each R is an alkyl, such as methyl or ethyl.

In some embodiments, the organically-modified silica of the outer layers further comprises an additional siloxane-linked organic group. The additional siloxane-linked organic group can include any convenient organic groups of interest. Mixtures of organic groups for incorporation into the outer layers of the silica particles can be selected to provide for a desired level of hydrophilicity or wettability. The organic group can be hydrophobic or hydrophilic (e.g., as described above). In some cases, the additional siloxane-linked organic group is a siloxane-linked hydrocarbon, such as a siloxane-linked alkyl or substituted alkyl. In certain cases, the additional siloxane-linked organic group is a siloxane-linked lower alkyl group, such as a siloxane-linked methyl, ethyl, n-propyl, isopropyl, n-butyl, tert-butyl or pentyl group. In certain embodiments, the additional siloxane-linked organic group is an ethyl group. In certain embodiments, the additional siloxane-linked organic group is a substituted ethyl group.

In some embodiments, the molar ratio of the siloxane-linked hydrophilic group to the additional siloxane-linked organic group in the outer layers is 0.1 or more, such as 0.2 or more, 0.3 or more, 0.4 or more 0.5 or more, 0.6 or more, 0.7 or more, 0.8 or more, 0.9 or more 1 or more, 1.5 or more, 2 or more, or even more. In certain cases, the molar ratio of the siloxane-linked hydrophilic group to the additional siloxane-linked organic group in the outer layers is 20 or less, such as 10 or less, 5 or less, 4 or less, 3 or less, 2 or less, or 1 or less.

The subject modified silica particles can also be surface modified. Any convenient surface functional groups can be utilized to covalently attach a group of interest to the subject particles. In some cases, free silanol groups are utilized to attach or bond the group of interest to the silica particles. In certain cases, a reactive functional group of a siloxane-linked organic group located at the surface of the subject particles is used to covalently attach the group of interest. Surface modifications of interest include, but are not limited to, modifications to introduce groups useful as a stationary phase in chromatography, such as RP, ion exchange, size exclusion chromatography (SEC), hydrophilic interaction liquid chromatography (HILIC), etc. A variety of groups which find use in chromatography stationary phases are available and can be adapted for use in the subject particles. In some instances, the modified silica particles are surface modified or bonded with a long chain hydrocarbon, such as a C8 or C18 alkyl group. In certain instances, the modified silica particles are surface modified with an ion exchange stationary phase. In certain instances, the modified silica particles are surface modified with a SEC stationary phase. In certain instances, the modified silica particles are surface modified with a HILIC stationary phase.

It is understood that a variety of methods (e.g., as described herein) can be used in characterizing the subject particles. Particle characterization measurements can be collected on a single particle or on a plurality of particles in a composition. Multiple particle characterization measurements can be collected on a single particle or on a plurality of particles to arrive at a distribution from which any convenient statistical metrics can be calculated. Any convenient methods for measuring and characterizing a particle or a composition of a plurality of particles can be utilized in conjunction with the subject particles and methods.

The subject particles can have solid cores having a size ranging from about 50% to about 90% of the size of the entire particles, in some cases, from about 60% to about 80% of the size of the entire particles. In some cases, the porous particles of this invention have a particle size distribution (one standard deviation) of 40% or less of the median particle size, such as 30% or less, 20% or less, 10% or less, or 5% or less of the median particle size. In some cases, the porous particles of this invention have a narrow particle size distribution defined by a mean and standard deviation, where the standard deviation is 40% or less of the mean particle size, such as 30% or less, 20% or less, 10% or less, or 5% or less of the mean particle size.

In some instances, the subject particles have a median diameter from about 0.5 μm to about 10 μm, such as from about 1.0 μm to about 5 μm. In certain cases, the particles have a specific surface area of the particles that is from about 5 $m^2/g$ to about 300 $m^2/g$. In some cases, the particles have a median particle diameter from about 0.5 μm to about 100 μm and a particle size distribution of no more than 15% of the median or mean diameter, in some cases, a particle size distribution of no more than 10% of the median or mean size, and in certain cases a distribution of no more than 5% of the median or mean diameter. In some cases, the porous particles have non-porous (e.g., solid) cores having a diameter ranging from about 50% to about 90% of the diameter of the entire particles, in some cases, from about 60% to about 80% of the diameter of the entire particles.

Methods of Preparing Particles

Aspects of the present disclosure include a process for making modified inorganic oxide (e.g., silica) particles. In some cases, the subject method is a method of preparing modified silica particles that includes: contacting silica particles with: a) water; b) an ionic fluoride; and c) an organosilane reagent comprising a hydrophilic moiety; to produce modified silica particles. The subject methods provide for incorporation of siloxane-linked hydrophilic groups into an outer layers of the silica particles which are produced. The subject organically modified silica particles can then subsequently be surface derivatized, e.g., bonded at available silanol groups, with any convenient organic groups. In some cases, the methods produce a stable stationary phase suitable for chromatography such as a reverse phase, ion exchange, size exclusion chromatography (SEC) or hydrophilic interaction liquid chromatography (HILIC). When the particles include a stationary reverse phase such as a C8 or C18 reverse phase, the underlying siloxane-linked hydrophilic groups of the outer layers can reduce or eliminate the risk of phase collapse during chromatography with highly polar mobile phases.

Silica particles can be strengthened by heating at about 900° C., but such treatment can result in a dehydroxylated silica comprising siloxane groups (Si—O—Si), which are generally not reactive or derivatizable. In some embodiments of the subject methods, prior to modification, the silica particles are heated (e.g., sintered) to improve particle stability. Accordingly, a rehydroxylation step can subsequently be performed after heating to regenerate silanol groups on the surface of silica particles of interest. During rehydroxylation of a silica particle, surface silica can repeatedly dissolve and precipitate back to the surface of the particles, effectively modifying the morphology, pore structure and/or surface area of the silica particles. The subject methods provide for incorporation, via siloxane-linkages, of organic groups including hydrophilic moieties into the silica particles during a rehydroxylation step. In some cases, mixtures of organosilane reagents are used to incorporate two or more organic groups into the particles. In certain instances, a first hydrophilic group and a second group which may be non-polar or hydrophobic are incorporated.

The methods of the present disclosure can be applied to a variety of particles. Any convenient silica starting material can be utilized in the subject methods. In certain instances of the subject methods, the silica starting material is unmodified, e.g., does not include any organic groups at the surface or incorporated inside the particle. Methods and materials which may be adapted for use in preparing the subject particles include those methods and materials described by Chen et al. in U.S. Pat. No. 8,277,883, the disclosure of which is herein incorporated by reference. Any porous or non-porous particles can be used in conjunction with the subject methods. In some aspects, the particles of the present disclosure comprise silica, such as, for example, porous silica particles, monolithic silica, hybrid monolithic silica, hybrid silica particles, superficially porous silica particles, superficially porous hybrid silica particles, totally porous silica particles, non-porous particles, high purity silica, metal containing silica, and combinations thereof. In certain aspects, the silica particles include totally porous silica particles. In some cases, the silica particles include superficially porous silica particles. In certain instances, the silica particles include a mixture of totally porous and superficially porous silica particles. In certain instances, the silica particles include core-shell particles.

In some instances, the starting material used to make the modified particles includes porous inorganic oxide particles, such as, porous silica microspheres. In certain cases, such silica particles can have an average diameter of 0.5 to 50 µm. In some instances, all or substantially all of the silica particles can have a diameter ranging from about 0.5 to about 1.5 times the average diameter of a plurality of particles. In certain cases, all or a portion of the silica particles can have an underivatized surface.

In some instances, the starting material used to make the subject particles are monodispersed solid inorganic oxide (e.g., metal oxide) particles that can be made by known processes (see, e.g., U.S. Pat. Nos. 3,634,588, 4,775,520, 4,983,369) or by sintering porous particles at temperatures as high as 1100° C. to the proper size to form solid particles. By "solid particles" is meant those having a very low pore volume (i.e., ≤0.005 cm$^3$/g). Such solid particle starting materials can be pure or substantially pure inorganic oxide particles.

In some embodiments, the method comprises contacting a silica particle with water in the presence of: (a) fluoride ion (F$^-$) such as, for example, HF or NH$_4$F, or at least one basic activator, and (b) an organosilane reagent. In another aspect, the present disclosure provides a single step method for functionalizing silica particles. In one aspect, the subject methods can be applied to a variety of particles. In another aspect, any particles suitable for use with the various methods and aspects disclosed herein can be used. In various aspects, the particles include silica, such as, for example, porous silica particles, monolithic silica, hybrid monolithic silica, hybrid silica particles, superficially porous silica particles, superficially porous hybrid silica particles, totally porous silica particles, non-porous particles, non-porous core-porous shell particles and combinations thereof. In one aspect, the silica particles include totally porous silica particles. In another aspect, the silica particles include superficially porous silica particles. In yet another aspect, the silica particles can include a mixture of totally porous and superficially porous silica particles. In one aspect, the silica particles comprise porous silica microspheres that have an average diameter of from about 0.5 to about 35 µm, from about 0.5 to about 20 µm, or from about 1.0 to about 10 µm. As used herein, the expression "average diameter" means the statistical average of the spherical diameters of the microspheres. The microspheres can, in one aspect, be substantially uniform in size such that less than 5% of the microspheres have a diameter less than about 0.5 times the average diameter and less than 5% have a diameter greater than 1.5 times the average diameter. In another aspect, the range is about 0.8 to about 1.2 times the average diameter. Furthermore, the microspheres can have controlled pore dimensions and a relatively large pore volume.

In one aspect, the silica particles can be produced from a coacervation technique. In another aspect, the silica particles can comprise heat strengthened thermally dehydroxylated porous silica microspheres, such as, for example, those described in U.S. Pat. No. 3,782,075, which is hereby incorporated by reference in its entirety and for the purpose of disclosing heat strengthened thermally dehydroxylated porous silica microspheres and methods related to the production thereof. Such heat strengthened particles can, in various aspects, be formed by contacting an aqueous sol of silica with a copolymerizable mixture of urea and formaldehyde or melamine and formaldehyde. Once polymerization is initiated, coacervation of the organic material occurs resulting in microspheres containing the colloidal particles. The microspheres can then be solidified, collected, washed and dried. At this stage, the microspheres consist of a plurality of colloidal particles embedded in a sphere filled with polymer. The organic material can then be burned off at a temperature sufficient to oxidize the organic constituents without melting or adversely affecting the inorganic material. In one aspect, the organic material can be burned by heating to a temperature of about 550° C. The porous microspheres can then be sintered at an elevated temperature for a time sufficient to strengthen the microparticles, for example, to the point where they will not fracture in use. In one aspect, sintering can be performed until the specific surface area of the microspheres has been reduced to a value which is at least 10% less than the surface area of the colloidal particles themselves.

Formation of the microspheres proceeds by association of the inorganic colloidal particles with the organic coacervate. While not wishing to be bound by theory, it is believed that the uniformity in both the size of the microspheres and the distribution of the colloidal particles within the microspheres depends on an interaction between hydroxyl groups on the surface of the colloidal particles and portions of the organic polymer chains in the coacervate materials. For this reason, in one aspect, at least prior to the onset of polymerization, the colloidal particles should have hydroxyl groups on their surface equivalent to a hydrated oxide surface.

In various aspects and for certain applications, it is desirable that the resulting modified particles be colloidal in size, such that at least two of the dimensions of these particles will be in the range of, for example, 3 nm to 500 nm and the other dimension will be in the range of 3 nm to 1000 nm. Particles having one dimension greater than a µm or having any dimension greater than about 0.1 times the diameter of the microspheres can be difficult to incorporate into spherical microparticles since the large dimension interferes with the formation of discrete spherical units.

In some instances, the silica particles can be sintered prior to modification to provide a desired strength. The particles can be sintered at a higher temperature, such as, for example, above 900° C. In some cases, the resulting microspheres can have uniform or substantially uniform pores, the diameters of which depend on the size of the colloidal particles used in their preparation and the volume ratio of the organic polymer to the silica material used. Heating, for example, calcining, particles to induce sintering can have multiple effects. First, the particles making up the porous structure sinter or fuse together to some extent at their points of contact to increase the physical strength of the microspheres. Second, the hydroxylated surface of silanol groups present before being heated can be dehydroxylated, i.e., water is lost by condensation of neighboring SiOH groups, generally leaving most of the surface consisting of siloxane groups, Si—O—Si. Generally, these siloxane groups are inert to reaction with silanizing agent. In various aspects, it has been found that the resulting micro spheres can have a total concentration of surface silanol groups of substantially less than about 5.5 µmol/m². Such microspheres can be generally unreactive with silanizing agents unless the surface is rehydroxylated.

In one aspect, the silica particles utilized in the subject methods have a concentration of surface silanol groups of less than about 8 µmol/m², less than about 6 µmol/m², or less than about 4 µmol/m². In another aspect, the silica particles of the present invention comprise heat strengthened thermally-dehydroxylated porous silica microspheres having a surface concentration of silanol groups of less than about 8 µmol/m².

In one aspect, the surface concentration of silanol groups refers to the number of moles of silanol groups which are detectable by thermogravimetric analysis (TGA) divided by the surface area of the silica microspheres (i.e., moles silanol groups per m²). It is known that the surface of the silica microspheres can have a maximum concentration of exposed silanol groups of about 8 µmol/m². Silanol groups in excess of this maximum concentration are "buried" beneath the surface of the silica. TGA is capable of measuring the sum of exposed surface silanol groups and "buried" silanol groups.

In some instances, rehydroxylation of the silica surface needs to occur to add silanol groups which, in turn, will react with the organosilane reagent present in the reaction mixture. In another aspect, activators that can promote rehydroxylation of the silica surface to the desired concentration of silanol groups are F⁻ ion such as, for example, HF or NH₄F, and basic activators, such as, for example, of quaternary ammonium hydroxides, ammonium hydroxide, and organic amines.

In certain cases, the silica particles can be contacted with an ionic fluoride, such as, for example, hydrofluoric acid (HF). In certain instances, the ionic fluoride can comprise one or more suitable ionic fluoride species of the same or varying composition. In some aspects, the ionic fluoride comprises hydrofluoric acid (HF). In certain aspects, the ionic fluoride comprises NH₄F. In some cases, the ionic fluoride comprises a combination of ionic fluorides, such as, for example, HF and NH₄F. In certain cases, the ionic fluoride comprises one or more other ionic fluoride species. In some instances, the ionic fluoride is acidic, such as, for example, an acidic solution. In some embodiments, the ionic fluoride does not contain a metal or metalloid cation that could contaminate the silica particles. In certain instances, the ionic fluoride does not contain a concentration of metal or metalloid cations that would adversely affect the resulting silica particles and/or their performance in, for example, a chromatographic application.

The specific composition and concentration of an acidic solution of ionic fluoride can vary, and the present disclosure is not limited to any particular ionic fluoride solution. The pH of an acidic solution of ionic fluoride can be adjusted if necessary, such that the pH is sufficiently low. In various aspects, the desired pH can be from about 2 to about 4. If necessary, other acids, such as, for example, a mineral acid or sulfuric acid can be used to adjust the pH of the solution. In some instances, the concentration of HF in solution is from about 50 ppm to about 4000 ppm, such as from about 50 ppm to about 1600 ppm, or from about 100 ppm to about 400 ppm. In some embodiments, HF in a concentration of from about 200 to about 400 ppm can be suitable to activate the rehydroxylation of a 300 m²/g to 400 m²/g silica. While not wishing to be bound by theory, it is believed that fluoride, introduced as HF or an ionic salt thereof at a pH from about 2 to about 4, reacts with a small amount of dissolved silica to form $SiF_6^{-2}$. The $SiF_6^{-2}$ can remain in equilibrium with a low concentration of HF, functioning as an activator to increase the rate of silica hydroxylation.

In certain embodiments, the silica particles can be contacted with a basic activator. In various aspects, the basic activator can comprise a quaternary ammonium hydroxide, ammonium hydroxide, an organic amine, or a combination thereof. In some cases, the basic activator comprises tetraalkylammonium hydroxide, ammonium hydroxides, primary organic amines and secondary organic amines.

In some instances, the relative rate of dissolution of silica by a basic activator can be controlled by maintaining the solution pH in the weakly-basic range. Many primary and secondary organic bases can rapidly dissolve silica above a pH of about 10.5, and more slowly at lower pH values. In some cases, a basic activator that provides a buffered pH of about 10.5 in dilute solution has desirable properties, such as, for example, when hydroxylation is carried out at from about 25° C. to about 50° C. At such temperatures, the solubility and the rate of transfer of silica can be much lower than at higher temperatures such as 100° C. In certain instances, a basic activator can be added in a sufficient amount to generate a pH of from about 9 to about 10.5. In certain cases, the concentration of a basic activator in solution can be from about 50 ppm to about 1600 ppm, or from about 100 ppm to about 400 ppm.

For basic activators the overall rate of attack on the silica surface generally decreases from methyl to ethyl to propyl. For example, normal ethyl-, propyl-, and butylamine, secondary ethylpropyl- and butylamine can be effective activators. Monomethyl- and dimethylamine can be utilized, if care is exercised. Steric effects appear to have a noticeable influence on the dissolution rate of the silica gel lattice as disclosed by Wehrli et al. (J. Chromatogr., 149:199 (1978)). In certain cases, methyl amines can be less practical because of their strong tendency to attack silica. Thus, methyl amines can be more difficult to control in generating the desired concentration of silanol groups. The rate of attack of a base on silica can be dependent on the strength ($pK_B$ value), concentration, and geometry of a selected basic activator.

In certain cases, a basic activator can include one or more tetraalkylammonium hydroxides. Although tetraalkylammonium hydroxides show strong aggressiveness for dissolving silica, these compounds can be suitable basic activators for rehydroxylation, even though tetramethylammonium, tetrapropylammonium and tetrabutylammonium hydroxide show equal or an even greater tendency than alkali hydroxides to attack the silica surface. Tetraalkylammonium hydroxides can be effective activators because at a pH of from about 9 to about 10.5, very little free base remains in solution. While not wishing to be bound by theory, it is believed that most of the base is absorbed as a monolayer on the silica surface, making the silica somewhat hydrophobic. Hydroxyl ions remaining in solution catalyze the breaking of siloxane groups, while the monolayer of activator on the silica surface retards dissolution and deposition of silica. Therefore, the process can be conveniently interrupted before the degree of hydroxylation passes beyond the desired range.

In some embodiments of the subject methods, a basic activator can be included which is selected from tetrabutylammonium hydroxides, ammonium hydroxide, a primary organic amine, and combinations thereof. In certain cases, when a sufficient amount of such a basic activator is added to an aqueous suspension of particles to raise the pH to a value between 9 and 10.5, very little free base remains in solution. Most of the base can be adsorbed as a monolayer on the silica surface making the silica surface somewhat hydrophobic. Hydroxyl ions remaining in solution can catalyze the breaking of siloxane groups while the monolayer of activator on the silica surface retards dissolution and deposition of silica. This process can be stopped before rehydroxylation of the microspheres passes beyond the desired concentration of silanol groups. In one aspect, the primary and secondary amines contain hydrocarbon groups that retard dissolution of silica.

In some embodiments, a basic activator can comprise ammonium hydroxide. For example, a dilute ammonium hydroxide solution at pH 10 can be contacted with silica for about 18 hours and at about 25° C. to rehydroxylate a silica surface to the desired concentration of silanol groups. In such cases, hydrolysis of a 440 m²/g silica by this procedure changed the surface area by only about 25%, and the pore volume of the silica remained essentially unchanged.

In certain aspects, a basic activator comprises at least one primary amine. In certain instances, the primary amine can comprise ethylenediamine, n-propylamine n-butylamine, or a combination thereof. Such amines can generate a pH of from about 9 to about 10.5. A pH in this range can accelerate rehydroxylation of the silica surface, without significant change in the surface area and pore diameter of the silica structure as can occur with strong organic bases such as quaternary ammonium hydroxides. In some cases, when the latter are used as activators, their concentration is low and the initial pH does not exceed about 10. In some aspects, secondary amines such as diethyl-, dipropyl- or dibutylamine, and combinations thereof are suitable activators. In certain instances, the activator is a tertiary amine.

In certain aspects, alkali- or alkaline-earth hydroxides such as NaOH, KOH and CaOH can be difficult to control in the rehydroxylation process. Use of these agents can result in significant undesirable changes in the pore structure and surface area of the starting silica particles. In addition, use of these agents can result in an undesired contamination of the starting silica with the cation from the hydroxide. This contamination causes deleterious effects with the silica support in subsequent chromatographic uses.

The subject methods provide for rehydroxylation of silica particles of interest in conjunction with an organosilane reagent (e.g., as described herein) to produce silica particles having a modfied outer layers. In some embodiments of the subject methods, the silica particles are contacted with water, either a fluoride ion such as, for example, HF or $NH_4F$, or a basic activator, and an organosilane reagent. In some embodiments of the subject methods, the silica particles are contacted with water, a fluoride ion (e.g., HF or $NH_4F$) and an organosilane reagent. In some embodiments of the subject methods, the silica particles are contacted with water, a basic activator, and an organosilane reagent.

Organosilane Reagent Including a Hydrophilic Moiety

Any convenient organosilane reagents can be utilized in the subject methods. An organosilane reagent is a chemical that is reactive with silanol groups of silica particles to form a siloxane linkage with the silica. The organosilane reagent can further include a hydrophilic group that includes a hydrophilic moiety (e.g., as described herein) that is well solvated in aqueous environments. In certain embodiments, the hydrophilic group includes a nitrogen-containing heterocycle, amide, carbamate, carboxylic acid, carboxy ester, methyl ether, cyano, amine, sulfonamide, sulfonate, urea, thiourea, hydroxyl, thiol, PEG, a zwitterionic group or a sulfonic acid. In some embodiments, the organosilane reagent has the following formula:

$$Z\text{-}L^1\text{-}Si(R^1)_aX_{(3-a)} \qquad (I)$$

wherein:
Z is the hydrophilic moiety;
$L^1$ is a linker;
$R^1$ is a lower alkyl;
X is a leaving group attached to the silicon atom; and
a is 0, 1 or 2.

In certain embodiments of formula (I), the hydrophilic moiety is a heterocycle or substituted heterocycle (e.g., a nitrogen-containing heterocycle), amide, carbamate, carboxylic acid, carboxy ester, methyl ether, cyano, amine, ammonium, sulfonamide, sulfonate, urea, thiourea, hydroxyl, thiol, PEG, a zwitterionic group or a sulfonic acid. In some embodiments of formula (I), Z is selected from 2-pyridyl, 3-pyridyl, 4-pyridyl, —CONH₂, —OCONHMe, —NHCOOMe, NHCONH₂, —OMe, CN and SO₃H. In certain embodiments of formula (I), the linker has a backbone of 20 atoms or less in length, such as 10 or less, 9 or less, 8 or less, 7 or less, 6 or less, 5 or less, 4 or less, 3 or less, 2 or less, or 1 atom in length. In certain instances of formula (I), each X is independently selected from halogen, substituted amino, cyano, alkoxy, O₃SCF₃, alkoxy and substituted alkoxy. In some cases of formula (I), each X is selected from Cl, OCH₃, OC₂H₅, (CH₃)₂N, (CH₃CH₂)₂N, I, Br, CN, OOCH₃, O(CO)CH₃ and O₃SCF₃. In some cases of formula (I), each X is an alkoxy, such as OEt.

In some embodiments, the organosilane reagent has formula (II) or (III):

$$Si(R^1)_aX_{(3-a)}\text{—}L^1\text{—}Z\text{—}L^2\text{—}Si(R^1)_aX_{(3-a)} \qquad (II)$$

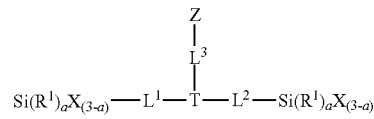

$$Si(R^1)_aX_{(3-a)}\text{—}L^1\text{—}\underset{\underset{L^3}{|}}{T}\text{—}L^2\text{—}Si(R^1)_aX_{(3-a)} \qquad (III)$$

wherein:
Z is the hydrophilic moiety;
$L^1$, $L^2$ and $L^3$ are each independently a covalent bond or a linker;
T is a branching atom or branching group;
each $R^1$ is independently a lower alkyl;
each X is independently a leaving group attached to the silicon atom; and
each a is independently 0, 1 or 2.

In certain embodiments of formula (II) or (III), the hydrophilic moiety is a heterocycle or substituted heterocycle (e.g., a nitrogen-containing heterocycle), amide, carbamate, carboxylic acid, carboxy ester, methyl ether, cyano, amine, ammonium, sulfonamide, sulfonate, urea, thiourea, hydroxyl, thiol, PEG, a zwitterionic group or a sulfonic acid. In some embodiments of formula (II), Z is selected from —O— and —NR'—, wherein R' is H, an alkyl or a substituted alkyl. In some embodiments of formula (II), Z is —N+(R')$_2$—, wherein R' is an alkyl (e.g., methyl or ethyl) or a substituted alkyl. In some embodiments of formula (IIIb), Z is selected from 2-pyridyl, 3-pyridyl, 4-pyridyl, —CONH$_2$, —OCONHMe, —NHCOOMe, NHCONH$_2$, —OMe, CN and SO$_3$H. In some embodiments of formula (Ib), Z is a pyridyl or a substituted pyridyl. In some embodiments of formula (IIIb), Z is a pyridyl or a substituted pyridyl.

In certain embodiments of formula (II) and (III), the L$^1$, L$^2$ and L$^3$ are each independently a linker having a backbone of 20 atoms or less in length, such as 10 or less, 9 or less, 8 or less, 7 or less, 6 or less, 5 or less, 4 or less, 3 or less, 2 or less, or 1 atom in length. In certain embodiments of formula (II) and (III), L$^1$ and L$^2$ have a combined backbone length of 20 atoms or less, such as 10 or less, 9 or less, 8 or less, 7 or less, 6 or less, 5 or less, 4 or less, 3 or less, 2 or less. In certain instances of formula (I), each X is independently selected from halogen, substituted amino, cyano, alkoxy, O$_3$SCF$_3$, alkoxy and substituted alkoxy. In some cases of formula (II) and (III), each X is selected from Cl, OCH$_3$, OC$_2$H$_5$, (CH$_3$)$_2$N, (CH$_3$CH$_2$)$_2$N, I, Br, CN, OOCH3, O(CO)CH$_3$ and O$_3$SCF$_3$. In some cases of formula (II) and (III), each X is an alkoxy, such as OEt.

Any convenient branching atoms or groups can be utilized in formula (III) to provide a connection to two siloxane linkages and a branched Z group. In some instances of formula (III), T is selected from a trisubstituted nitrogen atom, a trisubtituted carbon atom, a trisubstituted aryl or heteroaryl ring, a trisubstituted cycloalkyl or heterocycle ring. In certain cases, T is N. In certain cases, T is CH.

In certain embodiments of formulae (I)-(III), each R$^1$ is methyl. In certain embodiments of formulas (I)-(III), a is 0. In certain embodiments of formulae (I)-(III), a is 1. In certain embodiments of formulae (I)-(III), a is 2.

In some embodiments of the formula (I), the organosilane reagent has one of the following structures:

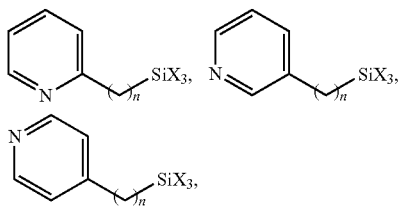

wherein each n is independently an integer from 1 to 18; and each X is independently a leaving group attached to the silicon atom.

In some embodiments of the formula (I), the organosilane reagent has one of the following structures:

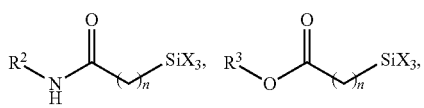

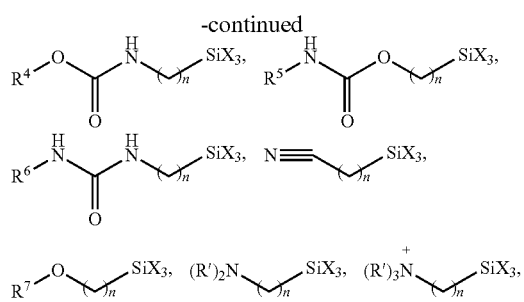

wherein:
 each n is independently an integer from 1 to 18;
 each X is independently a leaving group attached to the silicon atom; and
 R$^2$-R$^7$ and R' are each independently H, an alkyl or a substituted alkyl.

In certain embodiments of formula (I), the linker L$^1$ includes an additional hydrophilic moiety (e.g., as described herein). In certain instances, L$^1$ has the formula -L$^4$-Z$^2$-L$^5$- where Z$^2$ is the additional hydrophilic moiety and L$^4$ and L$^5$ are linkers (e.g., non-polar, neutral linkers). In certain cases, Z$^2$ is an ammonium group, such as a dialkylammonium. In some embodiments of formulae (I), the siloxane-linked hydrophilic group has the formula (IVa):

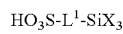

each X is independently a leaving group attached to the silicon atom. In some embodiments of formulae (IVa), L$^1$ has the formula -L$^4$-Z$^2$-L$^5$- where Z$^2$ is the additional hydrophilic moiety (e.g., as described herein) and L$^4$ and L$^5$ are linkers (e.g., non-polar, neutral linkers). In certain cases of formula (IVa), Z$^2$ is an ammonium group, such as a dialkylammonium.

In some embodiments of formulae (IVa), the siloxane-linked hydrophilic group has the formula:

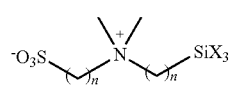

wherein each n is independently an integer from 1 to 18; and each X is independently a leaving group attached to the silicon atom.

In certain instances of the organosilane reagents described herein, each n is an integer of 10 or less, such as 9, 8, 7, 6, 5, 4, 3, 2 or 1. In certain instances of the organosilane reagent, each X is independently selected from halogen, substituted amino, cyano, alkoxy, O$_3$SCF$_3$, alkoxy and substituted alkoxy. In some cases, each X is selected from Cl, OCH$_3$, OC$_2$H$_5$, (CH$_3$)$_2$N, (CH$_3$CH$_2$)$_2$N, I, Br, CN, OOCH$_3$, O(CO)CH$_3$ and O$_3$SCF$_3$. In some cases, each X is an alkoxy, such as OEt.

In certain embodiments of formula (II), the organosilane reagent has one of the following structures:

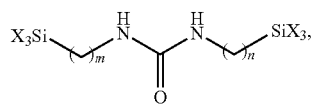

-continued

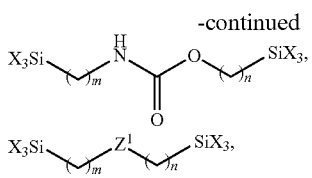

wherein n and m are independently an integer from 1 to 18; each X is independently a leaving group attached to the silicon atom; and $Z^1$ is selected from —O—, —NR'— and —$N^+(R')_2$—, wherein each R' is independently H, an alkyl or a substituted alkyl. In certain instances, $Z^1$ is —NR'— wherein each R' is independently H, an alkyl or a substituted alkyl. In certain instances, $Z^1$ is —$N^+(R')_2$—, wherein each R' is independently an alkyl or a substituted alkyl.

In some embodiments of formula (III), the organosilane reagent has one of the following structures:

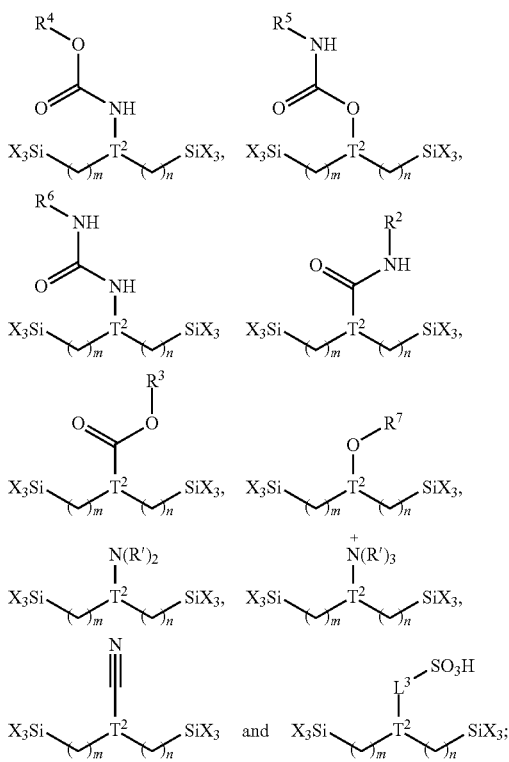

wherein:
n and m are independently an integer from 1 to 18;
each X is independently a leaving group attached to the silicon atom;
$Z^1$ is selected from —O— and —NR'—, wherein R' is H, an alkyl or a substituted alkyl;
$Z^2$ is selected from a trisubstituted carbon or nitrogen atom; and
$R^2$-$R^7$ and R' are each independently H, an alkyl or a substituted alkyl. In certain instances, $T^2$ is CH. In certain cases, $T^2$ is N. In certain cases, $T^2$ is $N^+R'$, wherein R' is an alkyl (e.g., methyl or ethyl). In certain instances, $R^2$ is H. In certain instances, $R^3$ is H. In certain instances, $R^4$ is H. In certain instances, $R^5$ is H. In certain instances, $R^6$ is H. In certain instances, $R^7$ is H. In certain instances, each R is H. In certain instances, each R is an alkyl, such as methyl or ethyl.

In some instances of the organosilane reagents, n and m are independently an integer of 10 or less, such as 9, 8, 7, 6, 5, 4, 3, 2 or 1. In certain instances, n+m is 10 or less, such as 9, 8, 7, 6, 5, 4, 3 or 2, or less. In some instances of the organosilane reagents, n is 2 and m is 2. In certain instances of the organosilane reagents, each X is independently selected from halogen, substituted amino, cyano, alkoxy, $O_3SCF_3$, alkoxy and substituted alkoxy. In certain embodiments of the organosilane reagents, X is selected from Cl, $OCH_3$, $OC_2H_5$, $(CH_3)_2N$, $(CH_3CH_2)_2N$, I, Br, CN, $OOCH_3$, $O(CO)CH_3$ and $O_3SCF_3$. In some instances of the organosilane reagents, $R^2$-$R^7$ and R' are each independently H or a lower alkyl (e.g., methyl).

Additional Organosilane Reagent

Aspects of the subject methods include contacting the particles with a mixture of two or more organosilane reagents, e.g., the organosilane reagent including a hydrophilic moiety (e.g., as described above) and an additional organosilane reagent. The additional organosilane reagent can be a second organosilane reagent including a hydrophilic moiety (e.g., as described above). In certain cases, the additional organosilane reagent can include a non-polar or hydrophobic group that is not well solvated in water. Any convenient mixtures of organosilane reagents can be utilized in the contacting step of the subject methods to produce modified silica particles that have mixtures of organic groups incorporated into the outer layers that provide for a desired level of hydrophilicity or wettability (e.g., in water).

In certain embodiments, the additional organosilane reagent has the formula $R^1_a R^2_b SiX_{4-a-b}$ or $R(R^1_a SiX_{3-a})_n$, where R is a substituted or unsubstituted aliphatic, cyclic, arylic or aromatic (e.g. R is an unsubstituted, saturated aliphatic organic moiety containing 1-8, e.g., 1-3 carbon atoms), $R^1$ and $R^2$ are organic ligands containing 1-4 carbon atoms (e.g., 1-2 carbon atoms), X is a leaving group attached to the silicon atom, (e.g., Cl, $OCH_3$, $OC_2H_5$, $(CH_3)_2N$, $(CH_3CH_2)_2N$, I, Br, CN, $OOCH_3$, $O(CO)CH_3$, $O_3SCF_3$), where a and b are positive integers equal to 0 or 1, and a plus b equals to 0, 1 or 2, n is a positive integer equal to 2-8 (e.g., 2).

Exemplary organosilanes which find use in the subject methods include, but are not limited to, bis(triethoxysilyl)ethylene, bis(triethoxysilyl)proplynene, bis(triethoxysilyl)methylene, methyltriethoxysilne, ethyltriethoxysilane, propyltriethoxysilane, butyltriethoxysilane, dimethyldiethoxysilane, diethyldiethoxysilane, phenyltriethoxysilane, and combinations thereof. Silanizing agents of interest which may find use in the subject methods are also disclosed in U.S. Pat. Nos. 3,722,181 and 3,795,313, the disclosures of which are incorporated herein by reference for the purpose of disclosing suitable silanizing agents. In a specific aspect, the additional organosilane reagent is bis(triethoxysilyl)ethylene.

In some embodiments, the organosilane reagent, or mixture thereof is present in an aqueous solution comprising HF or at least one basic activator in an amount of from 1% to 30% of silica particles by weight, or from about 2% to 10% of silica particles by weight. In various aspects, the organosilane reagent, or mixture thereof, can be added into the solution either dropwise under agitation or by all at once.

At least a portion of the surface of the silica particles can comprise newly generated material once the reaction is completed. Any silanols of the modified silica surface may serve as the points of attachment for further surface modification by commonly employed mono-, di-, or tri-functional organosilanes for chromatographic resins, of the following general formulas $R^1SiX_3$, $R^1R^2SiX_2$, $R^1R^2_2SiX$ respectively, where $R^1$ and $R^2$ are any convenient groups, such as alkyl, substituted alkyl, aryl or substituted aryl, e.g., long chain hydrocarbons (e.g., C8 or C18 alkyl groups) or groups that find use in ion exchange, SEC or HILIC chromatography stationary phases.

In some cases, any convenient functional groups present on the surface of the modified silica particles can be bonded to an additional agent that finds use in forming a chromatography stationary phase, e.g., an agent including long chain hydrocarbons (e.g., C8 or C18 alkyl groups) or groups that find use in ion exchange, SEC or HILIC chromatography stationary phases.

In some instances, the modified silica particles find use in chromatography applications without additional surface modification. In certain instances, the modified silica particles have a hydrophilic surface including a functional groups (e.g., as described herein), such as —OH, amide, amino, $R_4N^+$, —$SO_3H$, —COOH, a zwitterionic groups, etc. In certain instances, such particles can be used directly for SEC, ion exchange chromatography, or HILIC stationary phases. The modified silica particles can also be surface modified via free surface silanol groups that are utilized to attach or bond silanes agents (e.g., as described herein). For example, C18 or C8 silane agent can be bonded to the surface for RP. Reverse Phase C18 or C8 particles of interest can include a hydrophilic surface which can prevent phase collapse and provide a variety of selectivities as compared to conventional C18 or C8 RP HPLC. In some cases, the particles can be bonded to a variety of hydrophilic silane agents to provide for SEC, HILIC or ion exchange phases.

The specific method, rate, and/or conditions of contacting the silica particles, water, an ionic fluoride or basic activator, and multifunctional organosilane can vary, depending on, for example, the specific components and/or concentrations thereof, and the present disclosure is not intended to be limited to any particular conditions and/or method of contacting. In one aspect, contacting is performed at a temperature of from about ambient to about 100° C. for a sufficient period of time to generate the desired surface concentration of silanol groups. In another aspect, contacting is performed at a temperature of from about 25° C. to about 100° C. for a sufficient time to generate the desired surface concentration of silanol groups.

The resulting functionalized silica particles of the present disclosure can have a total concentration of silanol groups of from about 6 to about 16 μmol/m², in some cases from about 8 to about 16 μmol/m². The silanol-enriched microspheres can provide a chromatographic material which exhibits high hydrolytic stability and a low adsorption of basic compounds. In another aspect, the modified silica particles can exhibit enhanced chemical stability with respect to hydrolysis.

In some cases, the resulting particles of the present disclosure can provide high mechanical stability when used in, for example, columns for high pressure liquid chromatography. While not wishing to be bound by theory, it is believed that the stability results from a portion of the silica being dissolved by water containing HF or a basic activator and subsequently being re-precipitated at points of contact between the colloidal particles making up the aggregate structure of the silica microspheres. Thus, the re-precipitated silica provides additional reinforcement to the structure of the silica microspheres.

The extent of modification of the outer layers of the silica and/or of the silica surface can be determined in several ways including, for example, infrared spectroscopy, solid-state magic angle spinning nuclear magnetic resonance, proton spin counting NMR, and/or thermogravimetric analysis.

Utility

The subject particles, device, kits and methods can be employed in a variety of diagnostic, analytical, manufacturing and research applications. The subject silica particles find use in any applications where the separation or purification of analytes in a sample is desirable. In some cases, the subject particles find use in the separation of a plurality of analytes from a sample via a chromatography method, where the subject particles are configured as the stationary phase (e.g., a particulate support) in a separation device. Any convenient analytes can be separated, including but not limited to, small molecules, drugs, sugars, carbohydrates, oligonucleotides, peptides, proteins, antibodies, and conjugates thereof. In some cases, the subject particles find use in reverse phase chromatography applications with highly polar mobile phases, where the use of the particles reduces or eliminates the risk of phase collapse during chromatography.

In certain instances, the modified silica particles of the present disclosure can exhibit superior performance in various forms of liquid chromatographic applications including bonded-phase, liquid-solid and size-exclusion. For example, highly efficient liquid-solid chromatography can be carried out with particles having a diameter in the 1.0 to 15.0 μm range made from colloidal particles in the 5 to 50 nm range. In some cases, these particles can also be reacted with ion-exchange media to produce supports for ion-exchange chromatography. The range of useful microsphere diameters extends from about 0.5 to 50 μm.

Modified silica microspheres with pores of known dimension can be used for high speed size-exclusion chromatographic separation such as gel permeation and gel filtration. These separation techniques are based on the differential migration of molecules based on molecular size or molecular weight considerations. Small particle size promotes rapid mass transfer so that mobile phase velocities much higher than normal can be used while still maintaining equilibrium in the diffusion-controlled interaction that takes place within the pores in the totally porous structure. The strong, rigid characteristics of the present microspheres permit their use at very high pressures without particle degradation or deformation. The spherical nature of the particles permits the packing of columns with a large number of theoretical plates, which is of particular importance in the separation of large molecules. Of prime consideration in the size-exclusion chromatographic process is the internal volume of the particles used in the separation. The pore volume of the particles is moderately high in the microspheres, usually from 50 to 65% (measured by $N_2$ adsorption with the B.E.T. method) which is comparable to that found for the porous glasses and the porous organic gels widely used for size-exclusion chromatography.

The modified silica particles are also useful in gel filtration separations in aqueous systems and for the separation of small polar molecules. Microspheres having pores in the 50 to 2500 Angstroms range permit the high-speed size-exclusion chromatographic separation of a large variety of compounds in both aqueous and nonaqueous systems.

Although the support material of the present invention will be described primarily in connection with its use in chromatography applications, it should be understood, however, that such support materials have wider applicability such as, for example, as solid phase catalysts, solid phase synthesis of polypeptides and oligonucleotides, and sequencing of polypeptides.

Kits and Devices

Aspects of the present disclosure include separation devices including the subject particles. The subject particles can be utilized with any convenient separation devices having a stationary phase. Devices of interest include, but are not limited to, a chromatography column, a chip, a solid phase extraction media, a pipette tip and a disk.

Also provided by the present disclosure are kits including the particles, as described herein. The subject kits at least include particles (e.g., as described herein) and one or more components selected from an analytical standard, a separation device (e.g., a chromatography column, a chip, a solid phase extraction media, a pipette tip, a disk), an elution buffer and a wash buffer.

The various components of the kit can be present in separate containers or certain compatible components can be pre-combined into a single container, as desired. The subject kits can also include one or more other reagents for preparing or processing an analyte sample. The reagents can include one or more matrices, solvents, sample preparation reagents, buffers, desalting reagents, enzymatic agents, denaturing reagents, where calibration standards such as positive and negative controls can be provided as well. As such, the kits can include one or more containers such as vials or bottles, with each container containing a separate component for carrying out a sample processing or preparing step and/or for carrying out one or more steps of a sample preparation and analysis protocol. In addition, the kits can also include one or more control analyte mixtures, e.g., two or more control samples for use in testing the kit.

In addition to above-mentioned components, the subject kits can further include instructions for using the components of the kit to practice the subject methods, i.e., to prepare a sample and/or assess a sample. The instructions for practicing the subject methods are generally recorded on a suitable recording medium. For example, the instructions can be printed on a substrate, such as paper or plastic, etc. As such, the instructions can be present in the kits as a package insert, in the labeling of the container of the kit or components thereof (i.e., associated with the packaging or subpackaging) etc. In other embodiments, the instructions are present as an electronic storage data file present on a suitable computer readable storage medium, e.g. CD-ROM, diskette, etc. In yet other embodiments, the actual instructions are not present in the kit, but means for obtaining the instructions from a remote source, e.g. via the internet, are provided. An example of this embodiment is a kit that includes a web address where the instructions can be viewed and/or from which the instructions can be downloaded. As with the instructions, this means for obtaining the instructions is recorded on a suitable substrate.

The following examples are offered by way of illustration and not by way of limitation.

EXAMPLES

The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for.

Example 1

In a first example, 20 g of 5 µm silica particles from Daiso Co. (Osaka, Japan), with surface area (SA) of 300 m$^2$/g and pore size of 154 Å were slurried in a 210 ml 400 ppm HF solution in a round-bottom flask equipped with an overhead stirrer and a condenser. A silane in Table 1 was added to the solution. The mixture was refluxed for 24 hours, and then allowed to cool to room temperature and settle overnight. The top water layer was decanted, and 300 ml acetone was added. The silica particles were filtered, washed with acetone, and dried in vacuum oven at 100° C. for at least 2 hours.

TABLE 1

| Example | Silane added | SA (m$^2$/g) | Pore Size (Å) | C, N % |
|---|---|---|---|---|
| 1a | 8.43 g of ureidopropyltrimethoxysilane | 247 | 132 | 6.61% C 3.29% N |
| 1b | 5 g 3-methoxypropyltrimethtoxysilane | 234 | 147 | 6.56% C |

Example 2

20 g Poroshell 120 particles from Agilent Technologies, Inc. with surface area of 117 m$^2$/g and pore size of 131 Å were slurried in a 400 ml 2000 ppm HF solution. 10 g mixture of silanes containing bis(triethoxysilyl)ethane (BES) and 2-(4-pyridylethyl)trimethoxysilane (4-PETS) or 2-(2-pyridylethyl)trimethoxysilane (2-PETS) in Table 2 were added dropwise. The mixture was stirred at 95 degrees C. for 20 hours. After cooling to below 50 degrees C., the silica was centrifuged, and 400 ml water was added. The centrifugation bottle was shaken for 1 hour, and then centrifuged. Acetone was added to slurry the silica, and then the silica particles were filtered, and dried. 22 g of material was obtained.

TABLE 2

| Example | Silane | SA (m$^2$/g) | Pore Size (Å) | C % | N % |
|---|---|---|---|---|---|
| 2a | 10 g BES | 86 | 105 | 2.93 | 0.02 |
| 2b | 9.5 g BES/0.5 g 2-PETS | 76 | 122 | 3.45 | 0.17 |
| 2c | 9 g BES/1 g 2-PETS | 84 | 116 | 3.54 | 0.19 |
| 2d | 8 g BES/2 g 2-PETS | 86 | 112 | 3.85 | 0.28 |
| 2e | 9.5 g BES/0.5 g 4-PETS | 74 | 124 | 3.31 | 0.09 |
| 2f | 9.7 g BES/0.3 g 4-PETS | 72 | 124 | 3.30 | 0.10 |

Example 3

In a third example, Daiso silica (surface area of 296 m$^2$/g; pore size of 152 Å), Poroshell 120 silica (surface area of 117 m$^2$/g; pore size of 137 Å), and the silica particles made from Examples 1-2 were bonded with EC-C18 phase under reflux conditions in toluene. After reaction, the silica particles were further endcapped using conventional processes known in the art under reflux condition in toluene.

TABLE 3

| Example | Starting silica | C, N elemental analysis after C18 |
|---|---|---|
| 3a | Daiso silica | 14.96% C, 0.00% N |
| 3b | 1a | 12.47% C, 2.33% N |
| 3c | 1b | 13.58% C, 0.00% N |
| 3d | 2a | 7.50% C, 0.05% N |
| 3e | 2b | 7.08% C, 0.14% N |
| 3f | 2c | 7.53% C, 0.21% N |
| 3g | 2d | 7.53% C, 0.24% N |
| 3h | 2e | 6.71% C, 0.10% N |
| 3i | 2f | 6.96% C, 0.05% N |

Example 4

In a fourth example, 15 g Poroshell 120 silica (Surface Area of 139 m$^2$/g, pore size of 138 Å) were slurried in a 150 ml 400 ppm HF solution. 11.25 g 0-(methacryloxyethyl)-N-(triethoxysilyl-porpyl)carbamate was added dropwise. The mixture was stirred at room temperature overnight. The silica was filtered, washed with water, MeOH, THF, and ACN, and dried in a vacuum oven at 110 degree C. overnight.

TABLE 4

| Example | Silane | SA (m$^2$/g) | Pore Size (Å) | C % | N % |
|---|---|---|---|---|---|
| 4 | O-(methacryloxyethyl)-N-(triethoxysilyl-porpyl)carbamate | 131 | 87 | 5.94 | 0.72 |

Example 5

In a fifth example, 10 g 5 μm 150 Å silica particles (surface area of 430 m2/g, pore size of 140 Å) were slurried in 500 ml 1600 ppm HF solution, and a PEG silane, 2-Methoxy(polyethyleneoxy)propyl-trimethoxysilane was added dropwise over 15 minutes. The slurry was stirred overnight at room temperature. The silica was filtered, washed with water, MeOH and acetone, and then dried.

TABLE 5

| Example | PEG silane added | Carbon Loading |
|---|---|---|
| 5a | 4 g | 9.26% |
| 5b | 5 g | 9.94% |
| 5c | 6 g | 10.53% |
| 5d | 8 g | 11.19% |
| 5e | 10 g | 11.46% |

Example 6

Figure 3:
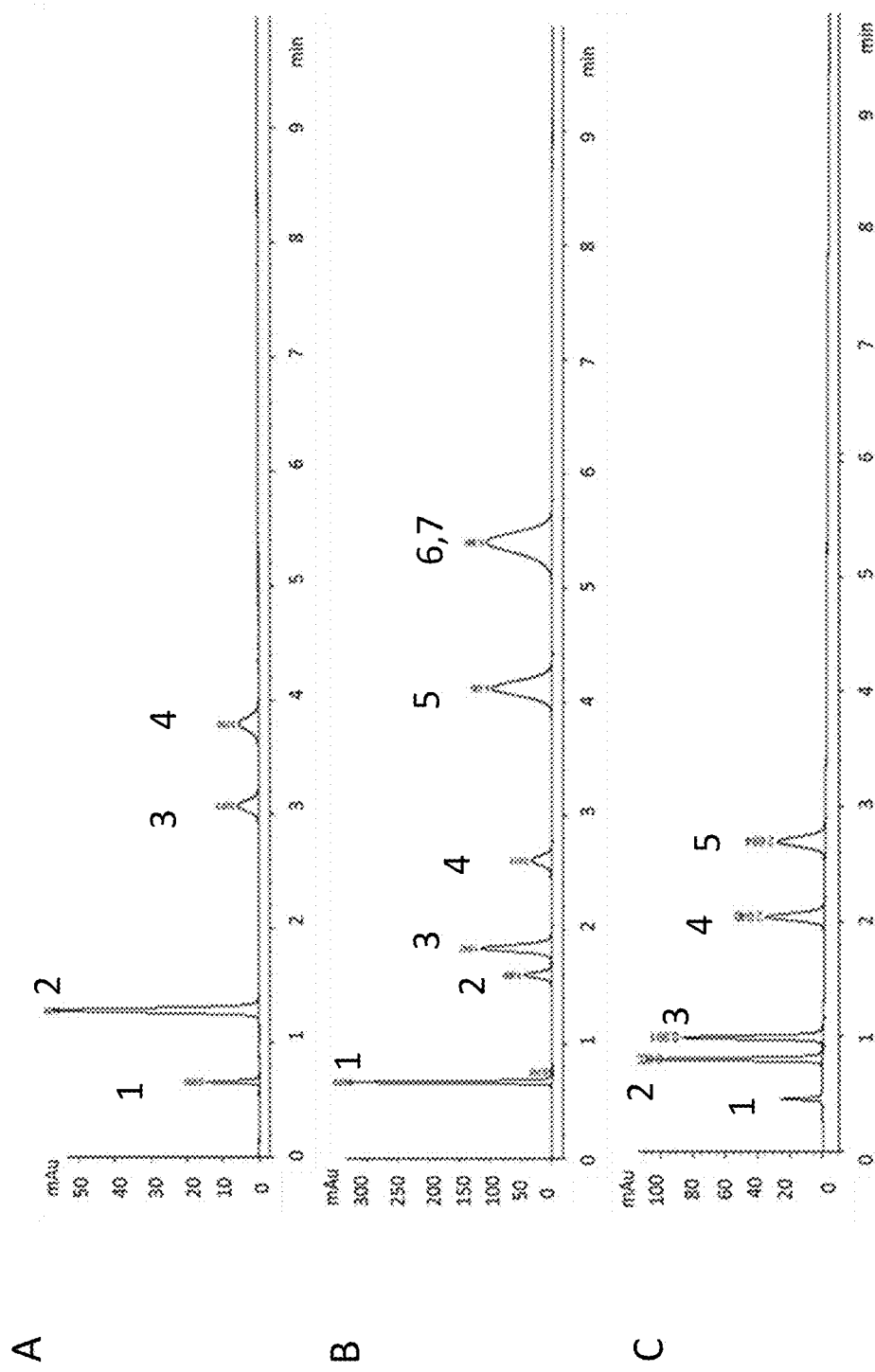
FIG. 3, panels A-C, illustrates the chromatographic performance of a reversed phase C18, 4.6×100 mm column including exemplary silica particles of Example 3c. Panel A illustrates separation of a mixture of compounds including (1) uracil, (2) phenol, (3) chloro-nitrobenzene and (4) naphthalene, using a mobile phase comprising MeOH/H2O (55/45); flow rate of 1.00 ml/min; temperature of 24 degree; UV detector of 254 nm. Panel B illustrates separation of a mixture of acidic compounds including (1) Thiourea, (2) 2-nitrobenzoic acid, (3) 4-hydroxybenzoic acid and (4) 3-cyanobenzoic acid, (5) phthalic acid, (6) 2-acylsalicylic acid, (7) benzoic acid, using a mobile phase comprising 20 mM phosphate pH 2.7/MeOH (75/25); flow rate of 1.00 ml/min; temperature of 40 degree; detector of 230 nm. Panel C illustrates separation of basic compounds including (1) uracil, (2) propranolol, (3) nortriptyline, (4) imipramine and (5) amitriptyline, using a mobile phase comprising 20 mM phosphate pH 7.0/ACN (50/50); flow rate of 1.20 ml/min; temperature of 50 degree; UV detector of 215 nm.

In a sixth example, the chromatographic performance of a reversed phase EC-C18 column (4.6×100 mm) from Example 3c was studied. FIG. 3, panel A shows a chromatogram generated using a mobile phase comprising MeOH/H$_2$O (55/45); flow rate of 1.00 ml/min; temperature of 24° C.; UV detector of 254 nm for neutral compounds. The analytes were (1) uracil, (2) phenol, (3) chloro-nitrobenzene, (4) naphthalene.

FIG. 3, panel B shows a chromatogram generated using a mobile phase comprising 20 mM phosphate pH 2.7/MeOH (75/25); flow rate of 1.00 ml/min; temperature of 40° C.; detector of 230 nm for acidic compounds. The analytes were (1) Thiourea, (2) 2-nitrobenzoic acid, (3) 4-hydroxybenzoic acid, (4) 3-cyanobenzoic acid, (5) phthalic acid, (6) 2-acyl-salicylic acid, (7) benzoic acid.

FIG. 3, panel C shows a chromatogram generated using a mobile phase comprising 20 mM phosphate pH 7.0/acetonitrile (50/50); flow rate of 1.20 ml/min; temperature of 50° C.; UV detector of 215 nm for strong basic compound. The analytes were (1) uracil, (2) propranolol, (3) nortiptyline, (4) imipramine, and (5) amitriptyline.

Example 7

Figure 4:
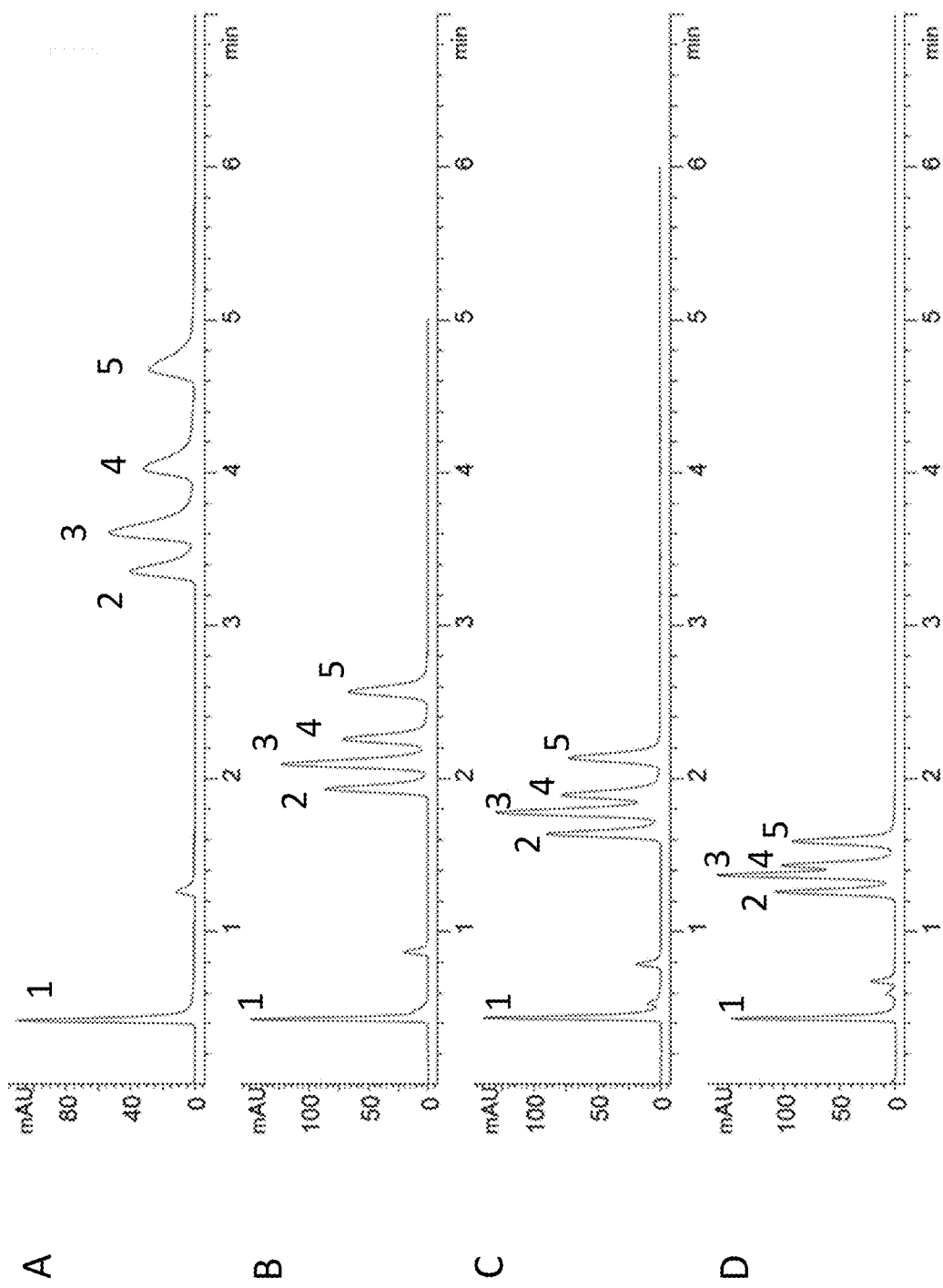
FIG. 4, panels A-D, compares the chromatographic performance of various reversed phase C18, 2.1×50 mm columns of separation of a mixture of basic compounds including (1) uracil, (2) propranolol, (3) nortriptyline, (4) amitriptyline, and (5) imipramine, using a mobile phase comprising 0.1% TFA in water/0.1% TFA in ACN (69/31); temperature of 30 degree; detector of 254 nm; flow rate of 0.25 mL/min. Panel A is a chromatogram obtained using a column of exemplary silica particles Example 3d. Panel B is a chromatogram obtained using a column of exemplary silica particles of Example 3e. Panel C is a chromatogram obtained using a column of exemplary silica particles of Example 3f. Panel D is a chromatogram obtained using a column of exemplary silica particles of Example 3g.

In a seventh example, the chromatographic performance of reversed phase EC-C18 columns (2.1×50 mm) from Example 3d-3g particles were studied. FIG. 4, panels A-D shows chromatograms generated using a mobile phase comprising 0.1% TFA in water/0.1% TFA in acetonitrile (69/31); temperature of 30° C.; detector of 254 nm; flow rate of 0.25 mL/min. The analytes were (1) uracil, (2) propranolol, (3) nortriptyline, (4) imipramine and (5) amitriptyline. Panel A (Example 3d). Panel B (Example 3e). Panel C (Example 3f). Panel D (Example 3g).

Figure 5:
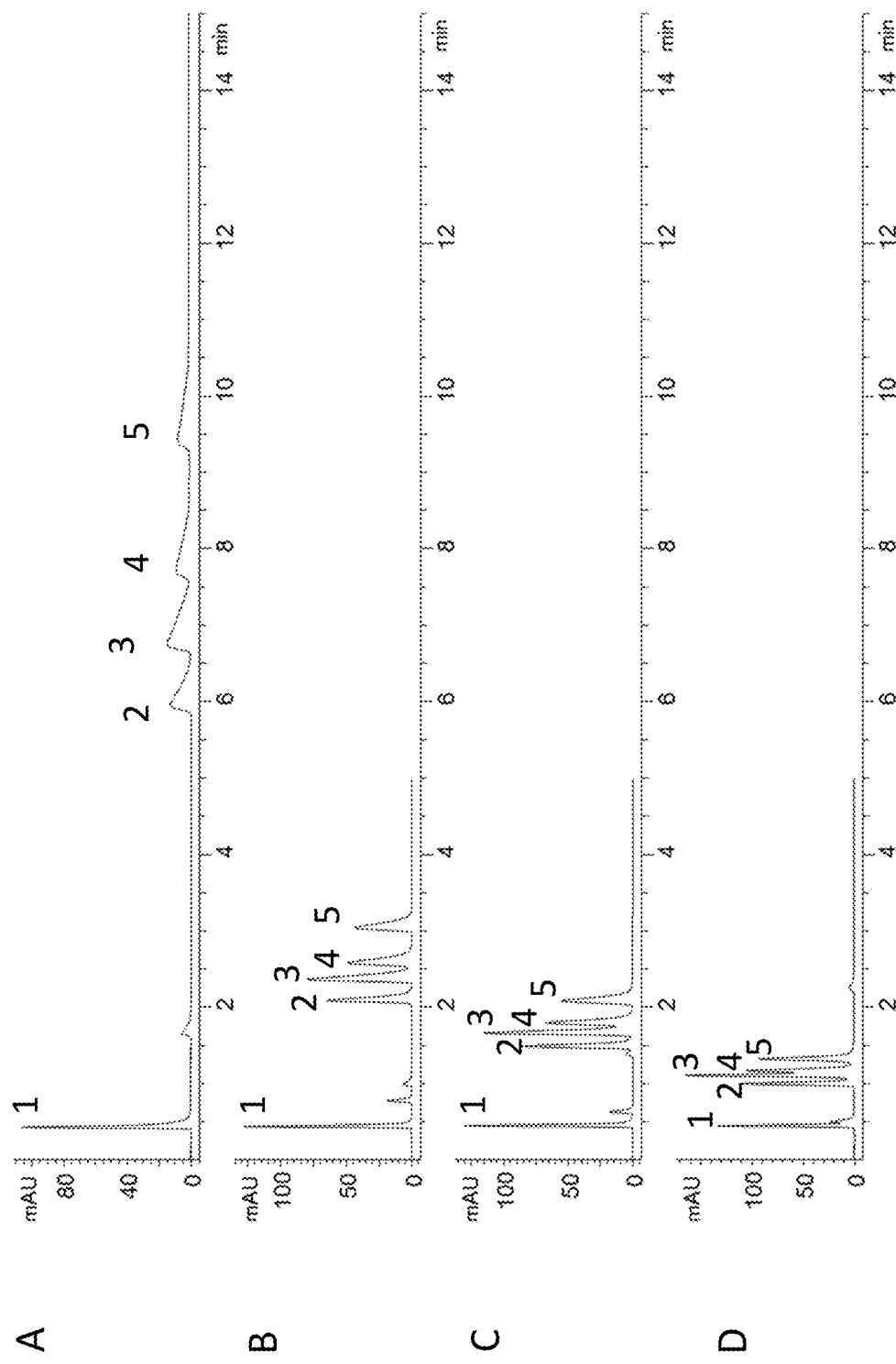
FIG. 5, panels A-D, compares chromatograms of various columns using a formic acid containing mobile phase to separate a mixture of analytes including (1) uracil, (2) propranolol, (3) nortriptyline, (4) amitriptyline and (5) imipramine. Panel A is a chromatogram obtained using a column of exemplary silica particles of Example 3d. Panel B is a chromatogram obtained using a column of exemplary silica particles of Example 3e. Panel C is a chromatogram obtained using a column of exemplary silica particles of Example 3f. Panel D is a chromatogram obtained using a column of exemplary silica particles of Example 3g.

FIG. 5, panels A-D shows chromatograms generated using a mobile phase comprising 0.1% formic acid in water/0.1% formic acid in ACN (78/22); temperature of 30° C.; detector of 254 nm; a flow rate of 0.25 mL/min. The analytes were (1) uracil, (2) propranolol, (3) nortriptyline, (4) imipramine, and (5) amitriptyline. Panel A (Example 3d). Panel B (Example 3e). Panel C (Example 3f). Panel D (Example 3g).

Figure 6:
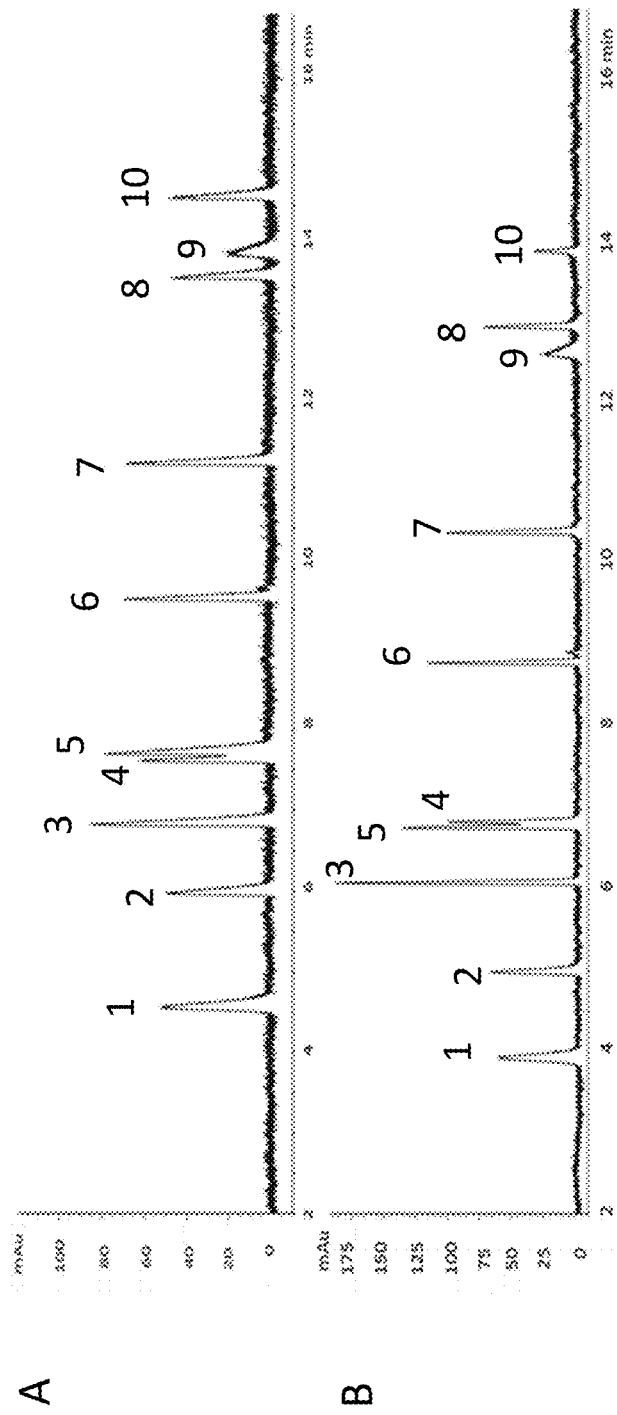
FIG. 6, panels A-B, shows chromatograms generated using a gradient method to separate a peptide mixture using a formic acid containing mobile phase on a 2.1×50 mm column. The method is: Mobile A: 0.1% formic acid in water; B: 0.1% formic acid in ACN; gradient for FIG. 4a: 2-20 min, B: 0%-50%; 20-21 min, B: 95%-95%; gradient for FIG. 4b: 0-20 min, B: 0%-50%; 20-21 min, B: 95%-95%; flow rate: 0.5 mL/min; injection volume: 2 uL; column temperature: 55 OC; UV: 220 nm. The peptide mixture is: 1) Bradykinin frag 1-7; 756.85 Da, 2) Bradykinin; 1060.21 Da, 3) Angiotensin II (human); 1045.53 Da, 4) Neurotensin; 1672.92 Da, 5) Angiotensin I (human); 1296.48 Da, 6) Renin substrate porcine; 1759.01 Da, 7) Angiotensinogen (1-14); 2231.61 Da, 8) Ser/Thr Protein phosphatase (15-31); 1952.39 Da, 9) [F14] Ser/Thr Protein phosphatase (15-31); 2099.00 Da, 10) Melittin (honey bee venom); 2846.46 Da. Panel A is a chromatogram obtained using a column of exemplary silica particles of Example 3d. Panel B is a chromatogram obtained using a column of exemplary silica particles of Example 3e.
Figure 7:
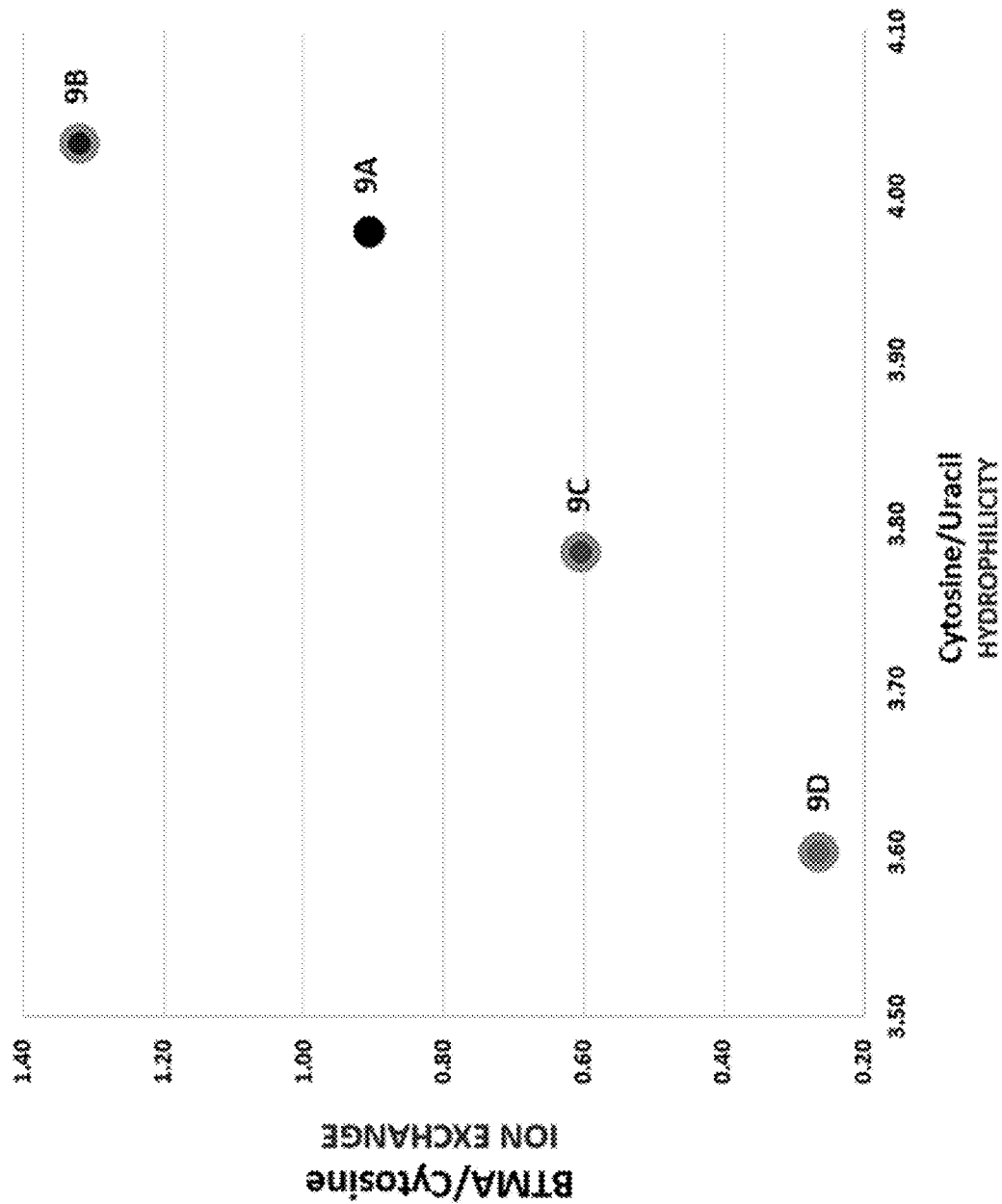
FIG. 7 shows a plot of hydrophilicity versus ion exchange selectivity of particles of interest (Examples 9a-9d, Table 7) having hybrid layer with zwitterionic or mixed charged groups.

FIG. 6, panels A (Example 3d) and panel B (Example 3e) show chromatograms generated using a gradient method to separate a peptide mixture standard in formic acid mobile phase. The method is: Mobile A: 0.1% formic acid in water; B: 0.1% formic acid in ACN; gradient for FIG. 6, panel A: 2-20 min, B: 0%-50%; 20-21 min, B: 95%-95%; gradient for FIG. 6, panel b: 0-20 min, B: 0%-50%; 20-21 min, B: 95%-95%; flow rate: 0.5 mL/min; injection volume: 2 uL; column temperature: 55° C.; UV: 220 nm. The peptide standard is: 1) Bradykinin frag 1-7; 756.85 Da, 2) Bradykinin; 1060.21 Da, 3) Angiotensin II (human); 1045.53 Da, 4) Neurotensin; 1672.92 Da, 5) Angiotensin I (human); 1296.48 Da, 6) Renin substrate porcine; 1759.01 Da, 7) Angiotensinogen (1-14); 2231.61 Da, 8) Ser/Thr Protein phosphatase (15-31); 1952.39 Da, 9) [F14] Ser/Thr Protein phosphatase (15-31); 2099.00 Da, 10) Melittin (honey bee venom); 2846.46 Da. Peak capacity at 4σ for FIG. 7, panel A is 65 and peak capacity for FIG. 4, panel B is 103.

Example 8: Preparation of Hybrid Layer with Other Polar Groups on Poroshell 120

10 g Poroshell 120 particles from Agilent Technologies, Inc. with surface area of 117 m$^2$/g and pore size of 131 Å were slurried in a 100 ml 2000 ppm HF solution. Mixture of silanes containing bis(triethoxysilyl)ethane (BES) and others in Table 9 were added dropwise. The mixture was stirred at 95 degrees C. for 20 hours. After cooling to below 50 degrees C., the silica was centrifuged, and 400 ml water was added. The centrifugation bottle was shaken for 1 hour, and then centrifuged. Acetone was added to slurry the silica, and then the silica particles were filtered, and dried.

TABLE 6

| Example | Polar silane | C % | N % | Surface area (m2/g) | Pore Size (Å) |
|---|---|---|---|---|---|
| 8a | 2.5 g BES + 5.0 g of N-(3-TRIETHOXYSILYLPRO-PYL)GLUCONAMIDE | 3.35 | 0.32 | 106 | 112 |
| 8b | 2.5 g BES + 3.0 g of p-AMINOPHENYLTRI-METHOXYSILANE | 3.77 | 0.44 | 113 | 88 |
| 8c | 2.5 g BES + 5.0 g of N-(3-TRIETHOXYSILYLPRO-PYL)-4-HYDROXYBUTYR-AMIDE | 5.63 | 0.78 | 128 | 86 |
| 8d | 2.5 g BES + 5.0 g of N-TRIMETHOXYSILYLPRO-PYL-N,N,N-TRIMETHYL-AMMONIUM CHLORIDE | 2.72 | 0.21 | 103 | 116 |

Example 9: Preparation of Hybrid Layer with Zwitterionic or Mixed Charged Groups on Poroshell 120

10 g Poroshell 120 particles from Agilent Technologies, Inc. with surface area of 117 m²/g and pore size of 131 Å were slurried in a 100 ml 2000 ppm HF solution. Mixture of silanes containing bis(triethoxysilyl)ethane (BES) and several charged silanes in Table 10 were added dropwise. The mixture was stirred at 95 degrees C. for 20 hours. After cooling to below 50 degrees C., the silica was centrifuged, and 400 ml water was added. The centrifugation bottle was shaken for 1 hour, and then centrifuged. Acetone was added to slurry the silica, and then the silica particles were filtered, and dried.

TABLE 7

| Example | Charged silane |
|---|---|
| 9a | 2.5 g BES + 2.6 g of 3-{[DIMETHYL(3-TRIMETHOXYSILYL)PROPYL]AMMONIO}PRO-PANE-1-SULFONATE |
| 9b | 2.5 g BES + 2.2 g of 3-(TRIHYDROXYSILYL)-1-PROPANESULFONIC ACID + 0.6 g of N-TRIMETHOXYSILYLPROPYL-N, N, N-TRIMETHYLAMMONIUM CHLORIDE |
| 9c | 2.5 g BES + 1.5 g of 3-(TRIHYDROXYSILYL)-1-PROPANESULFONIC ACID + 1.3 g of N-TRIMETHOXYSILYLPROPYL-N, N, N-TRIMETHYLAMMONIUM CHLORIDE |
| 9d | 2.5 g BES + 0.8 g of 3-(TRIHYDROXYSILYL)-1-PROPANESULFONIC ACID + 2.0 g of N-TRIMETHOXYSILYLPROPYL-N, N, N-TRIMETHYLAMMONIUM CHLORIDE |
| 9e | 2.5 g BES + 5.0 g of 3-(TRIHYDROXYSILYL)-1-PROPANESULFONIC ACID |

Example 10: Chromatographic Evaluation of Particles Having Hybrid Layer with Zwitterionic or Mixed Charged Groups The hydrophilic chromatographic selectivity of columns (2.1×50 mm) from Example 9a-d particles were studied based on Mohammed et al. (J. Chromatogr. A, 1260:126 (2012)) under a mobile phase comprising 90% Acetonitrile, 10% 25 mM ammonium acetate buffer at pH 6.8; temperature of 24° C.; detector of 254 nm; flow rate of 0.3 mL/min. The analytes were toluene, uracil, cytosine, and benzyltrimethylammonium chloride (BTMA). The toluene was used as the unretained dead time marker. Cytosine/uracil was used to probe the hydrophilic characteristics of the column and BTMA/cytosine to probe the ion exchange character. A selectivity plot of Example 9a-9d in terms of their hydrophilicity and ion exchange behavior was constructed in FIG. 7. Based on the difference in the ion exchange behavior, the surface charged is demonstrated to be controllable by the ratio of positively and negatively charged silane added in the process.

Figure 8:
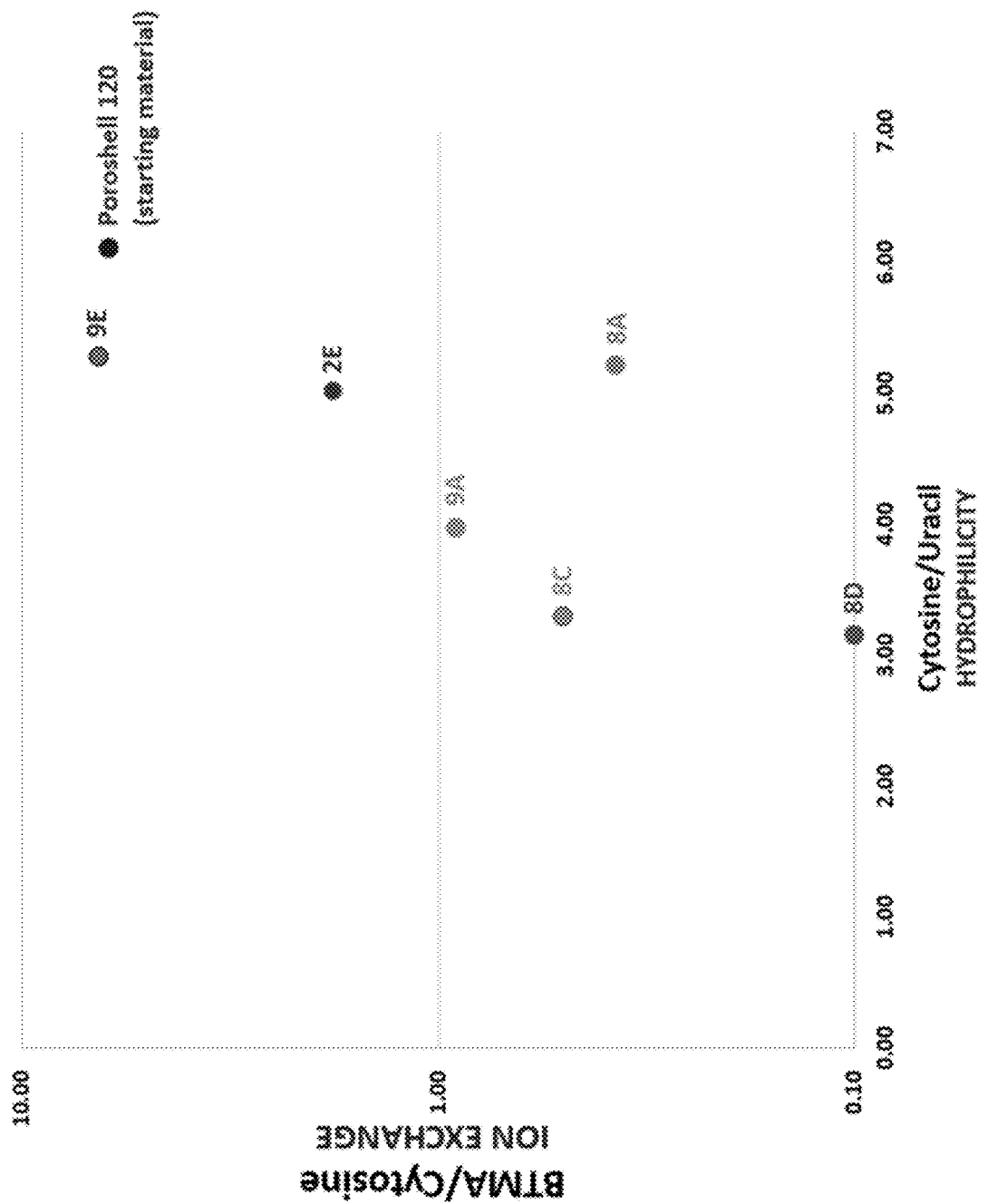
FIG. 8 shows a plot of hydrophilicity vs. ion exchange selectivity plot of particles of interest having hybrid layer with various polar groups.

Example 11: A Selectivity Plot of Poroshell 120 Having Hybrid Layer with Various Polar Groups The hydrophilic chromatographic performance of columns (2.1×50 mm) from particles made in Example 2, 8, 9 were studied under a mobile phase comprising 90% Acetonitrile, 10% 25 mM ammonium acetate buffer at pH 6.8; temperature of 24° C.; detector of 254 nm; flow rate of 0.3 mL/min. The analytes were toluene, uracil, cytosine, and benzyltrimethylammonium chloride (BTMA). The toluene was used as the unretained dead time marker. Cytosine/uracil was used to probe the hydrophilic characteristics of the column and BTMA/cytosine to probe the ion exchange character. A selectivity plot of in terms of their hydrophilicity and ion exchange behavior was constructed in FIG. 8. The functionality is demonstrated to be controllable by the silanes added in the process.

Notwithstanding the appended claims, the disclosure set forth herein is also described by the following clauses.

1. A modified silica particle, comprising an outer layer that is composed of organically-modified silica comprising a siloxane-linked hydrophilic group having one of formulae (Ib), (IIb) or (IIIb):

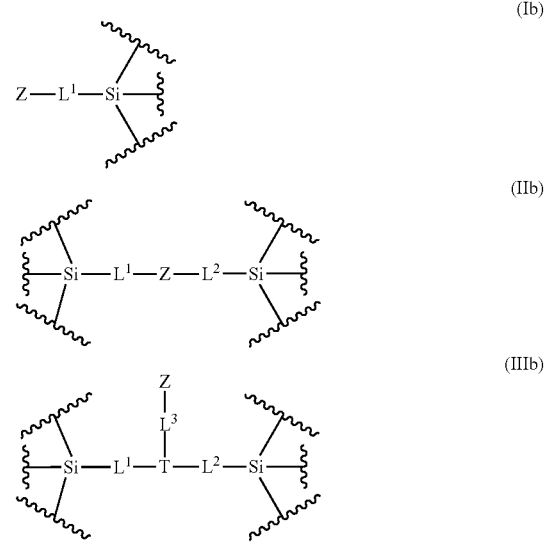

wherein:
Z is a hydrophilic moiety;
$L^1$, $L^2$ and $L^3$ are each independently a covalent bond or a linker; and
T is a branching atom or branching group.

2. The particle of Clause 1, wherein the hydrophilic moiety is selected from a nitrogen-containing hetereocycle, amide, carbamate, carboxylic acid, carboxy ester, methyl ether, cyano, amine, ammonium, sulfonamide, sulfonate, urea, thiourea, hydroxyl, thiol, PEG, a zwitterionic group, and sulfonic acid.

3. The particle of clause 1, wherein the hydrophilic moiety is a charged moiety, e.g., in a suitable aqueous environment. It is understood that acids and bases can be present in a protonated or deprotonated state. In some cases, a protonated state for an acid gives a neutral molecule and for a base a positive charge. In certain cases, the deprotonated state for a base is neutral and for an acid is a negative charge. The charge of the hydrophilic moiety can be dependent on pH.

4. The particle of clause 1, wherein:
when the siloxane-linked hydrophilic group is of formula (Ib), $L^1$ is a C1-C6 alkyl and Z is selected from 2-pyridyl, 3-pyridyl, 4-pyridyl, —$CONH_2$, —OCONHMe, —NHCOOMe, $NHCONH_2$, —OMe, CN and $SO_3H$;
when the siloxane-linked hydrophilic group is of formula (IIb), $L^1$ and $L^2$ are each independently a C1-C6 alkyl, wherein the combined length of $L^1$ and $L^2$ is 10 carbons or less, and Z is selected from —O— and —NR'—, wherein R' is H, an alkyl or a substituted alkyl; and when the siloxane-linked hydrophilic group is of formula (IIIb), $L^1$, $L^2$ and $L^3$ are each independently a covalent bond or a C1-C6 alkyl, wherein the combined length of $L^1$ and $L^2$ is 10 carbons or less, and Z is selected from 2-pyridyl, 3-pyridyl, 4-pyridyl, —$CONH_2$, —OCONHMe, —NHCOOMe, $NHCONH_2$, —OMe, CN and $SO_3H$.

5. The particle of clause 1, wherein the organically-modified silica of the outer layer further comprises one or more additional distinct siloxane-linked organic groups, e.g., 2 or more or 3 or more distinct siloxane-linked organic groups, each independently selected from the groups described herein.

6. The particle of clause 1, wherein the organically modified silica particle is surface modified with a chromatography stationary phase.

7. A method of preparing modified silica particles, the method comprising:
contacting silica particles with:
a. water;
b. an ionic fluoride; and
c. an organosilane reagent comprising a hydrophilic moiety;
to produce modified silica particles wherein the hydrophilic moiety of the organosilane reagent is incorporated into an outer layer of the silica particles.

8. The method of clause 7, wherein the hydrophilic moiety of the organosilane reagent is selected from a nitrogen-containing heterocycle, amide, carbamate, carboxylic acid, carboxy ester, methyl ether, cyano, amine, ammonium, sulfonamide, sulfonate, urea, thiourea, hydroxyl, thiol, PEG, a zwitterionic group and sulfonic acid.

9. The method of clause 7, wherein the hydrophilic moiety is a charged moiety in an aqueous environment.

10. The method of clause 7, wherein the organosilane reagent has one of formula (I), (II) and (III):

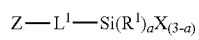
(I)

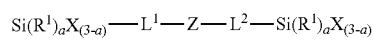
(II)

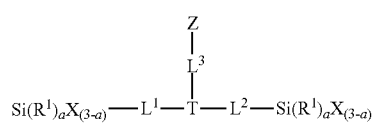
(III)

wherein:
Z is the hydrophilic moiety;
L, $L^1$, $L^2$ and $L^3$ are each independently a covalent bond or a linker;
each $R^1$ is independently a lower alkyl;
T is a branching atom or branching group;
each X is independently a leaving group attached to the silicon atom; and
each a is independently 0, 1 or 2.

11. The method of clause 10, wherein the organosilane reagent has one of the following structures:

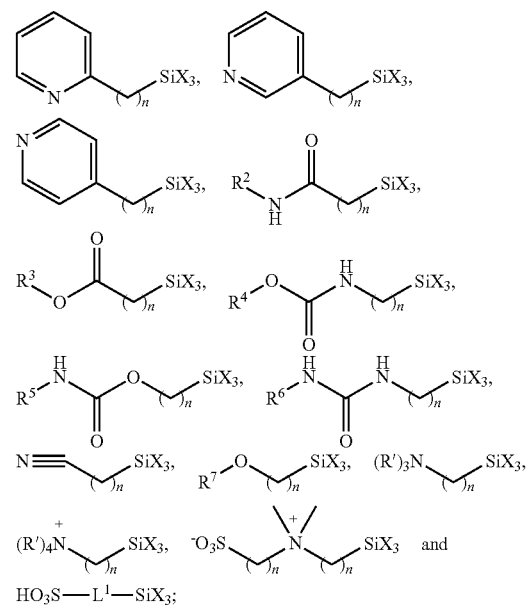

wherein:
each n is independently an integer from 1 to 18;
each X is independently a leaving group attached to the silicon atom; and
$R^2$-$R^7$ and R' are each independently H, an alkyl or a substituted alkyl.

12. The method of clause 10, wherein the organosilane reagent has one of the following structures:

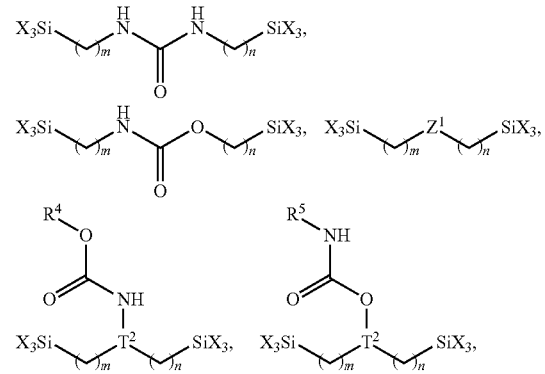

-continued

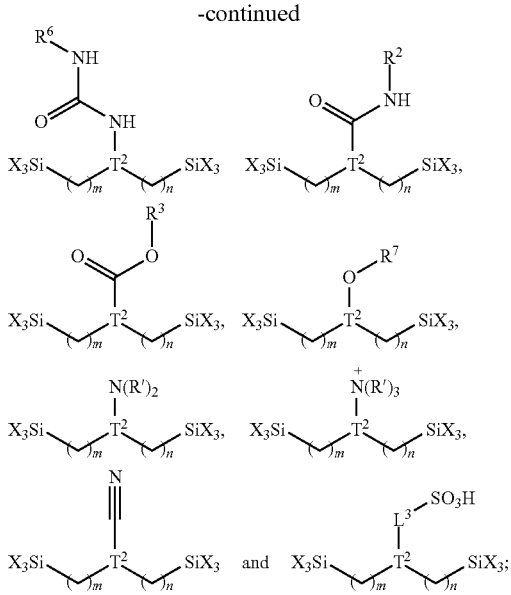

wherein:

n and m are independently an integer from 1 to 18;

each X is independently a leaving group attached to the silicon atom;

$Z^1$ is selected from —O—, —NR'— and —N$^+$(R')$_2$—, wherein each R' is independently H, an alkyl or a substituted alkyl;

$T^2$ is selected from a trisubstituted carbon or nitrogen atom; and $R^2$-$R^7$ and R' are each independently H, an alkyl or a substituted alkyl.

13. The method of clause 11, wherein X is selected from Cl, OCH$_3$, OC$_2$H$_5$, (CH$_3$)$_2$N, (CH$_3$CH$_2$)$_2$N, I, Br, CN, OOCH$_3$, O(CO)CH$_3$ and O$_3$SCF$_3$.

14. The method of clause 7, further comprising, after the contacting step, modifying the surface of the modified silica particles with a chromatography stationary phase.

15. The method of clause 14, comprising modifying the surface of the modified silica particles with a long chain organosilane reagent to produce the chromatography stationary phase.

16. The method of clause 7, wherein the silica particles comprise unmodified silica prior to the contacting step.

17. The method of clause 7, further comprising, prior to the contacting step, heating the silica particles to improve particle stability.

18. The method of clause 7, further comprising, during the contacting step, heating the silica particles to improve particle stability.

19. The method of clause 7, wherein the ionic fluoride comprises at least one of hydrofluoric acid, ammonium fluoride, or a combination thereof.

20. The method of clause 7, wherein the contacting step comprises contacting the particles with one or more additional organosilane reagent.

21. The method of claim 7, wherein the contacting step comprises contacting the silica particles with the two or more distinct organosilane reagents each comprising a hydrophilic moiety.

22. The method of clause 20, wherein the one or more additional organosilane reagent each independently have the formula $R^1_aR^2_bSiX_{4-a-b}$ or $R(R^1_aSiX_{3-a})_n$, wherein $R^1$ and $R^2$ are alkyl or substituted alkyl groups containing 1-4 carbon atoms, R is a substituted or unsubstituted aliphatic, cyclic, arylic, or aromatic, X is a leaving group attached to the silicon atom, a and b are independently 0 or 1, wherein a plus b equals to 0, 1 or 2, and n is a positive integer of 2 to 8.

23. The method of clause 7, wherein contacting occurs at a temperature and for a time sufficient to form a new surface on at least a portion of the plurality of silica particles.

Although the foregoing invention has been described in some detail by way of illustration and example for purposes of clarity of understanding, it is readily apparent to those of ordinary skill in the art in light of the teachings of this invention that certain changes and modifications can be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the embodiments shown and described herein. Rather, the scope and spirit of present invention is embodied by the appended embodiments.

What is claimed is:

1. A modified silica particle, comprising an outer layer that is composed of organically-modified silica comprising a siloxane-linked hydrophilic group having one of formulae (Ib), (IIb) or (IIIb):

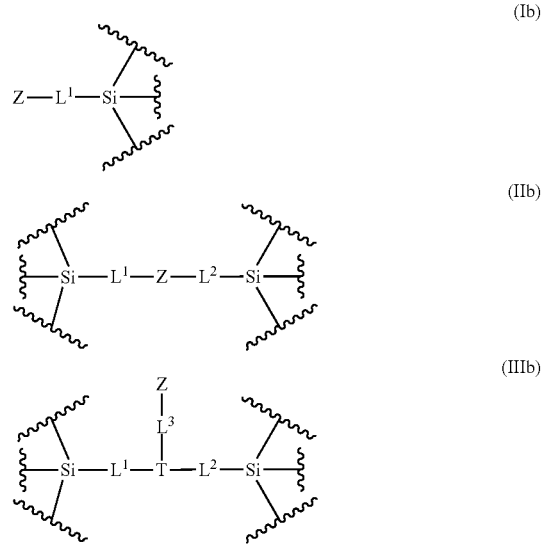

wherein:
Z is a hydrophilic moiety;
L¹, L² and L³ are each independently a covalent bond or a linker; and
T is a branching atom or branching group;
wherein the siloxane-linked hydrophilic group is in the outer layer below a particle surface.

2. The particle of claim 1, wherein the hydrophilic moiety is selected from a nitrogen-containing heterocycle, amide, carbamate, carboxylic acid, carboxy ester, methyl ether, cyano, amine, ammonium, sulfonamide, sulfonate, urea, thiourea, hydroxyl, thiol, PEG, a zwitterionic group, and sulfonic acid.

3. The particle of claim 1, wherein the hydrophilic moiety is a charged moiety.

4. The particle of claim 1, wherein:
when the siloxane-linked hydrophilic group is of formula (Ib), L¹ is a C1-C6 alkyl and Z is selected from 2-pyridyl, 3-pyridyl, 4-pyridyl, —CONH₂, —OCONHMe, —NHCOOMe, NHCONH₂, —OMe, CN and SO₃H;
when the siloxane-linked hydrophilic group is of formula (IIb), L¹ and L² are each independently a C1-C6 alkyl, wherein the combined length of L¹ and L² is 10 carbons or less, and Z is selected from —O— and —NR'—, wherein R' is H, an alkyl or a substituted alkyl; and
when the siloxane-linked hydrophilic group is of formula (IIIb), L¹, L² and L³ are each independently a covalent bond or a C1-C6 alkyl, wherein the combined length of L¹ and L² is 10 carbons or less, and Z is selected from 2-pyridyl, 3-pyridyl, 4-pyridyl, —CONH₂, —OCONHMe, —NHCOOMe, NHCONH₂, —OMe, CN and SO₃H.

5. The particle of claim 1, wherein the organically-modified silica of the outer layer further comprises one or more additional distinct siloxane-linked organic group.

6. The particle of claim 1, wherein the organically modified silica particle is surface modified with a chromatography stationary phase.

7. A method of preparing modified silica particles, the method comprising:
contacting silica particles with:
a. water;
b. an ionic fluoride; and
c. an organosilane reagent comprising a hydrophilic moiety;
to produce modified silica particles according to claim 1 wherein the hydrophilic moiety of the organosilane reagent is incorporated into an outer layer of the silica particles.

8. The method of claim 7, wherein the hydrophilic moiety of the organosilane reagent is selected from a nitrogen-containing heterocycle, amide, carbamate, carboxylic acid, carboxy ester, methyl ether, cyano, amine, ammonium, sulfonamide, sulfonate, urea, thiourea, hydroxyl, thiol, PEG, a zwitterionic group and sulfonic acid.

9. The method of claim 7, wherein the hydrophilic moiety is a charged moiety in an aqueous environment.

10. The method of claim 7, wherein the organosilane reagent has one of formula (I), (II) and (III):

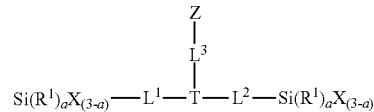

wherein:
Z is the hydrophilic moiety;
L, L¹, L² and L³ are each independently a covalent bond or a linker;
each R¹ is independently a lower alkyl;
T is a branching atom or branching group;
each X is independently a leaving group attached to the silicon atom; and
each a is independently 0, 1 or 2.

11. The method of claim 7, further comprising, during the contacting step, heating the silica particles to improve particle stability.

12. The method of claim 7, wherein the contacting step comprises contacting the particles with one or more additional organosilane reagent.

13. The method of claim 7, wherein the contacting step comprises contacting the silica particles with the two or more distinct organosilane reagents each comprising a hydrophilic moiety.

14. The method of claim 12, wherein the one or more additional organosilane reagent each independently have the formula $R^1_a R^2_b SiX_{4-a-b}$ or $R(R^1_a SiX_{3-a})_n$, wherein R¹ and R² are alkyl or substituted alkyl groups containing 1-4 carbon atoms, R is a substituted or unsubstituted aliphatic, cyclic, acrylic, or aromatic, X is a leaving group attached to the silicon atom, a and b are independently 0 or 1, wherein a plus b equals to 0, 1 or 2, and n is a positive integer of 2 to 8.

15. The method of claim 7, wherein contacting occurs at a temperature and for a time sufficient to form a new surface on at least a portion of the plurality of silica particles.

16. The particle of claim 1, wherein the particle comprises a solid core having a size ranging from about 50% to about 90% of the size of the entire particle.

17. The particle of claim 1, wherein the particle has a diameter from about 0.5 μm to 50 μm.

18. The particle of claim 1, wherein the organically-modified silica comprises a siloxane-linked hydrophilic group having formula (IIb).

19. The particle of claim 1, wherein the organically-modified silica comprises a siloxane-linked hydrophilic group having formula (IIIb).

20. The particle of claim 1, wherein the organically-modified silica also comprises the siloxane-linked hydrophilic group at the particle surface.

* * * * *